US008689324B2

(12) United States Patent
Bowman et al.

(10) Patent No.: US 8,689,324 B2
(45) Date of Patent: Apr. 1, 2014

(54) TECHNIQUES TO EXPLAIN AUTHORIZATION ORIGINS FOR PROTECTED RESOURCE OBJECTS IN A RESOURCE OBJECT DOMAIN

(75) Inventors: Brian Bowman, Apex, NC (US); Elizabeth A. Lyne, Cary, NC (US); Catherine Hitti, Raleigh, NC (US); Jianping Yang, Raleigh, NC (US); J. Forest Boozer, Cary, NC (US)

(73) Assignee: SAS Institute, Inc., Cary, NC (US)

( * ) Notice: Subject to any disclaimer, the term of this patent is extended or adjusted under 35 U.S.C. 154(b) by 0 days.

(21) Appl. No.: 13/439,536

(22) Filed: Apr. 4, 2012

(65) Prior Publication Data

US 2013/0269027 A1     Oct. 10, 2013

(51) Int. Cl.
    *G06F 21/00*      (2013.01)

(52) U.S. Cl.
    USPC .................................. 726/21; 726/4; 713/167

(58) Field of Classification Search
    None
    See application file for complete search history.

(56) References Cited

U.S. PATENT DOCUMENTS

| | | | |
|---|---|---|---|
| 5,261,102 A | | 11/1993 | Hoffman |
| 6,308,274 B1 * | | 10/2001 | Swift ................................ 726/9 |
| 7,136,871 B2 * | | 11/2006 | Ozer et al. ............................ 1/1 |
| 7,370,344 B2 | | 5/2008 | Boozer et al. |
| 7,493,570 B2 * | | 2/2009 | Bobbin et al. ................. 715/800 |
| 7,644,086 B2 * | | 1/2010 | Boozer et al. .................... 726/21 |
| 2003/0236979 A1 * | | 12/2003 | Himmel et al. ................ 713/167 |
| 2004/0254934 A1 * | | 12/2004 | Ho et al. ............................ 707/9 |
| 2009/0222884 A1 | | 9/2009 | Shaji et al. |
| 2010/0325159 A1 | | 12/2010 | Wright et al. |
| 2012/0304307 A1 * | | 11/2012 | Ramesh et al. ................. 726/28 |

* cited by examiner

*Primary Examiner* — Fikremariam A Yalew

(74) *Attorney, Agent, or Firm* — Kacvinsky Daisak Bluni PLLC

(57) ABSTRACT

Techniques to explain authorization origins for protected objects in an object domain are disclosed. In one embodiment, for example, an apparatus may comprise a processor circuit, a request processor component operative on the processor circuit to receive and process a request for an authorization origin of a resource object, the authorization origin comprising an access control with a permission arranged to control access to the resource object based on an identity, and a resource origin component operative on the processor circuit to identify the authorization origin of the resource object from a set of interrelated resource objects and associated access controls, retrieve authorization origin information for the authorization origin, and present the authorization origin information in a user interface view. Other embodiments are described and claimed.

18 Claims, 29 Drawing Sheets

1000

RECEIVE A REQUEST FOR AN AUTHORIZATION ORIGIN OF A RESOURCE OBJECT, THE AUTHORIZATION ORIGIN COMPRISING AN ACCESS CONTROL WITH A PERMISSION ARRANGED TO CONTROL ACCESS TO THE RESOURCE OBJECT BASED ON AN IDENTITY
*1002*

IDENTIFY THE AUTHORIZATION ORIGIN OF THE RESOURCE OBJECT FROM A SET OF INTERRELATED RESOURCE OBJECTS AND ASSOCIATED ACCESS CONTROLS
*1004*

RETRIEVE AUTHORIZATION ORIGIN INFORMATION FOR THE AUTHORIZATION ORIGIN
*1006*

PRESENT THE AUTHORIZATION ORIGIN INFORMATION IN A USER INTERFACE VIEW
*1008*

*FIG. 10*

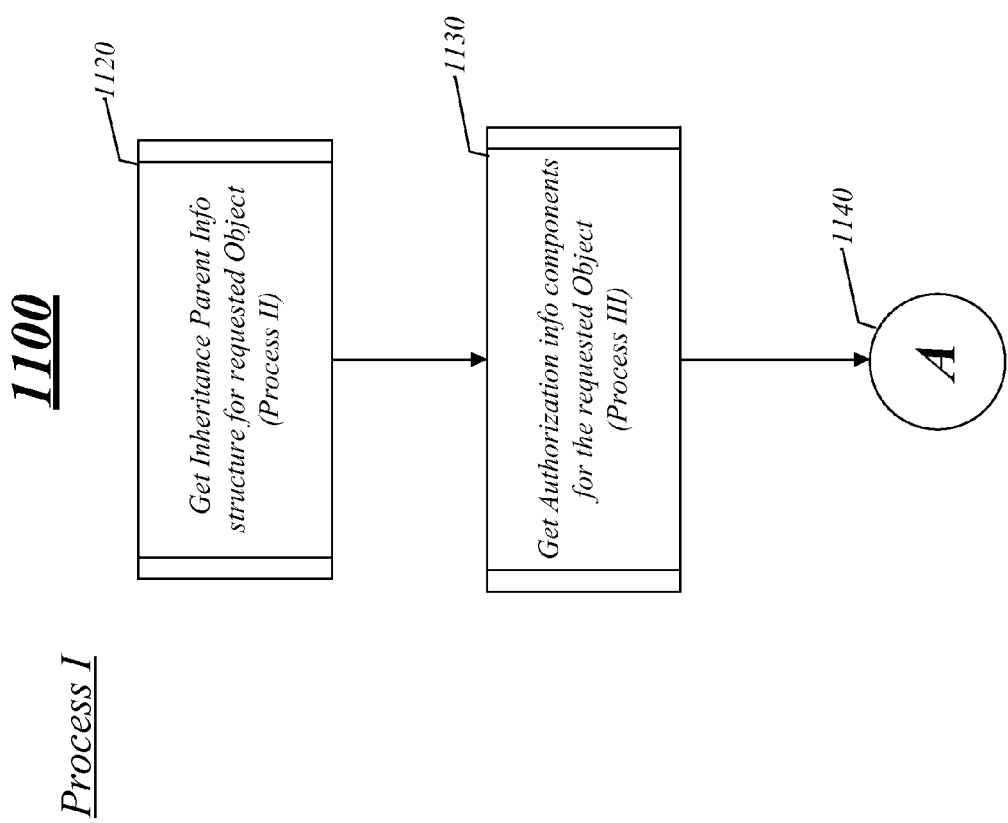

TECHNIQUES TO EXPLAIN AUTHORIZATION ORIGINS FOR PROTECTED RESOURCE OBJECTS IN A RESOURCE OBJECT DOMAIN

BACKGROUND

A resource object domain such as data repository for computing resources of an enterprise may contain a wide range of information that it may be desirable to protect. In order to provide such protection, an access control system may be implemented. Such an access control system may track and enforce various types of permissions associated with various users and groups and applied to various resource objects. For example, an access control system may deny a request to access a particular resource object based on a permission rule that is specific to the resource object and the requestor, specific to the resource object and to a group of which the requestor is a member, or specific to a parent of the resource object and a group of which the requestor is a member.

In a large-scale resource object domain, when a traditional access control system is employed, the reasons for particular decisions to grant or deny particular requests may not be readily ascertainable by users of the access control system. For example, it may not be readily ascertainable by a user whether his request to access a particular resource object was denied based upon his identity, his membership in a group, or upon some other factor. Consequently, techniques to explain authorization origins for protected resource objects in a resource object domain may be desirable. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to explain authorization origins for protected resource objects in a resource object domain. Some embodiments are particularly directed to techniques to explain authorization origins for protected resource objects among a set of interrelated resource objects and associated access controls. In one embodiment, for example, an apparatus may comprise a processor circuit, a request processor component operative on the processor circuit to receive and process a request for an authorization origin of a resource object, the authorization origin comprising an access control with a permission arranged to control access to the resource object based on an identity, and a resource origin component operative on the processor circuit to identify the authorization origin of the resource object from a set of interrelated resource objects and associated access controls, retrieve authorization origin information for the authorization origin, and present the authorization origin information in a user interface view. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 10 illustrates an embodiment of a first logic flow for the apparatus of FIG. 1.

FIG. 11 illustrates an embodiment of a second logic flow for the apparatus of FIG. 1.

DETAILED DESCRIPTION

Figure 1:
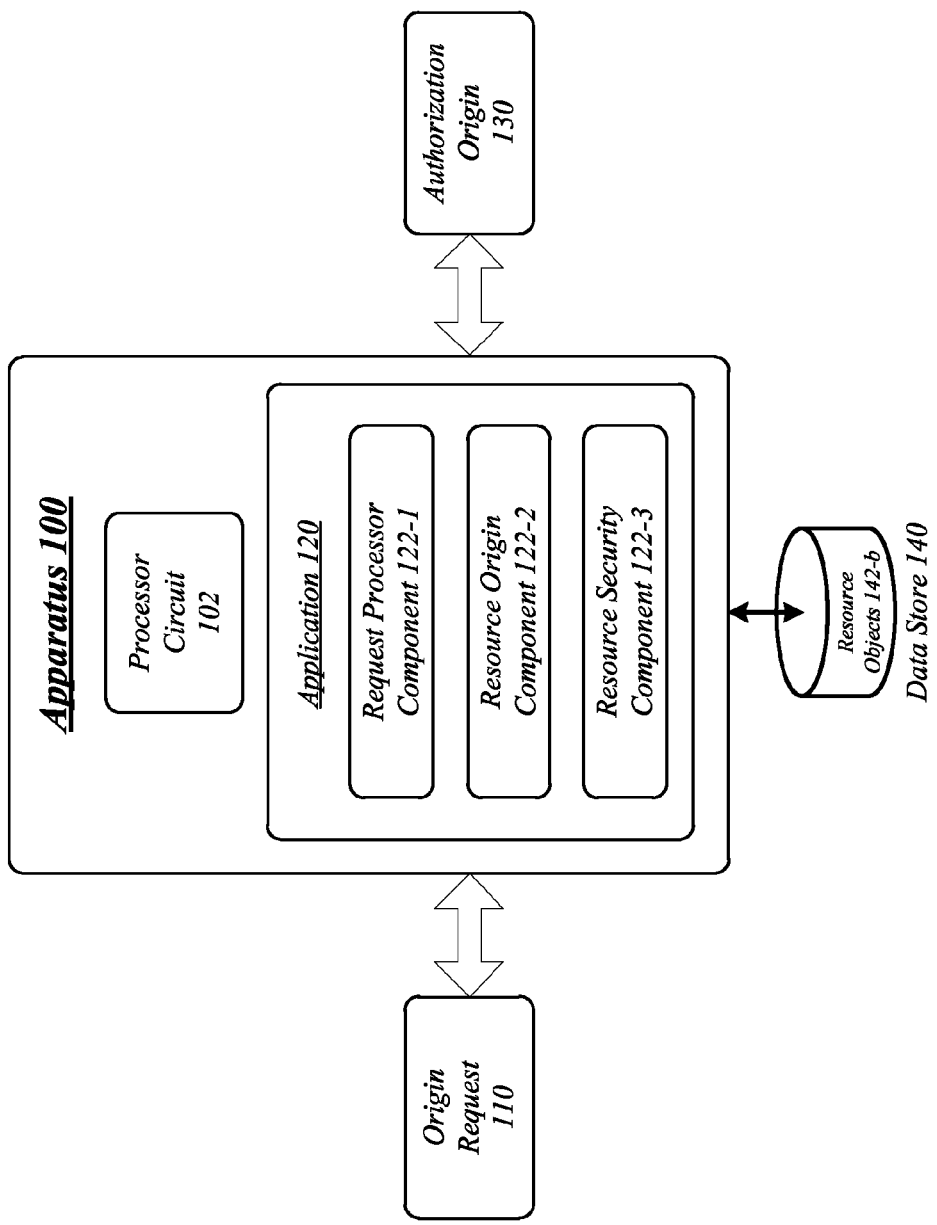
FIG. 1 illustrates an embodiment of an apparatus to explain authorization origins for protected resource objects in a resource object domain.

Various embodiments are directed to techniques to explain authorization origins for protected resource objects in a resource object domain. In some such embodiments, the protected resource objects may be protected using an access control system.

An access control system for a resource object domain may protect resource objects within the resource object domain by controlling various types of access to those resource objects. For example, the access control system may control read access to the resource objects, write access to the resource objects, read access to metadata of the resource objects, write access to metadata of the resource objects, and/or various other types of access to the resource objects. The access control system may control access to a particular object by applying one or more access controls to that particular object. The embodiments are not limited in this context.

For a particular resource object, the access control system may control various types of access to that resource object based on permissions associated with the various types of access. A given permission may specify that a particular type of access should be granted or denied to one or more identities. An identity may comprise a particular user within the resource object domain, or a group of users within the resource object domain. A permission associated with a particular resource object may control access of a particular type to the particular resource object by a particular identity. For example, a permission P associated with a resource object O may specify that an identity corresponding to a user X should be granted read access to the resource object O. In such a case, read access to the resource object O may be said to be explicitly granted to user X by permission P.

In some cases, a multi-level nested group structure may exist within the resource object domain. For example, a user X may be a member of a first group G1, and group G1 may in turn be a member of a second group G2. Under such circumstances, permissions applied explicitly to groups G1 and/or G2 may indirectly apply to user X. If a particular resource object domain contains a complex nested group structure, in which user X is a member of a variety of groups at a variety of nesting levels, it may not be readily ascertainable from where a permission applied to user X actually originates.

Similarly, in some resource object domains, particular resource objects may exhibit a parent/child relationship with other resource objects. In such resource object domains, a particular resource object that is a child of one or more parent resource objects may inherit access controls or decisions made from access controls from those one or more parent resource objects. Under such circumstances, the grant/deny decision for a particular identity's request for a particular type of access to a particular resource object may be based on a permission which originates from a parent of the particular resource object. In cases in which parent resource objects are in turn children of other parent resource objects, a multi-level nested parent/child resource object hierarchy may exist. If such a resource object hierarchy is complex, it may not be readily ascertainable from where a permission applied to a particular user with respect to a particular resource object actually originates. In order to address these issues, techniques to explain authorization origins for protected resource objects in a resource object domain may be desirable.

Various embodiments are directed to operations for determining the origins of authorizations for protected resource objects in a resource object domain. In some embodiments, a nested group structure is analyzed to determine whether a particular permission is applied to a particular identity for a particular resource object based on the particular identity's membership in one or more groups at one or more levels of the nested group structure. In some embodiments, a multi-level resource object hierarchy is analyzed to determine whether a particular permission is applied to a particular identity for a particular resource object based on inheritance by that particular resource object of permissions associated with one or more resource objects residing on one or more higher levels of the multi-level resource object hierarchy. In the event of conflicts, the nesting levels may be used to resolve the conflicts. Other embodiments are described and claimed.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for an apparatus 100. In one embodiment, the apparatus 100 may comprise a processor circuit 102 and a software application 120, and the software application 120 may comprise one or more components 122-a. Although the apparatus 100 shown in FIG. 1 has a limited number of elements in a certain topology, it may be appreciated that the apparatus 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-a may include components 122-1, 122-2, 122-3, 122-4 and 122-5. The embodiments are not limited in this context.

The apparatus 100 may comprise software application 120. Software application 120 may be generally arranged to implement a resource object access control system operative to control access to resource objects in a resource object domain. For example, software application 120 may be arranged to control access to resource objects comprising enterprise computing resources of an organization. The embodiments are not limited to this example.

Software application 120 may comprise a request processor component 122-1. The request processor component 122-1 may be operative on the processor circuit 102 to receive and process an origin request 110 for an authorization origin 130 of a resource object 142-b. In various embodiments, an authorization origin 130 may comprise an access control with a permission arranged to control access to a given resource object 142-b based on an identity. In one embodiment, for example, an authorization origin 130 may comprise a direct or explicit authorization made on a given resource object 142-b. In one embodiment, for example, an authorization origin 130 may comprise an indirect or inherited authorization made on a related resource object 142-b of a given resource 142-b. The embodiments are not limited in this context.

Software application 120 may comprise a resource origin component 122-2. The resource origin component 122-2 may be operative on the processor circuit 102 to identify an authorization origin 130 of a resource object 142-b, retrieve authorization origin information for the authorization origin 130, and present the authorization origin information in a user interface view. In various embodiments, the resource origin component 122-2 may be operative to present the authorization origin information as part of an authorization map in the user interface view, the authorization map comprising rit and scope origin information for multiple resource objects. In some embodiments, the resource origin component 122-2 may be operative on the processor circuit 102 to identify the authorization origin 130 of the resource object 142-b from a set of interrelated resource objects and associated access controls. In various embodiments, the resource origin component 122-2 may determine that an access control for the resource object 142-b is the authorization origin. The embodiments are not limited in this context.

Software application 120 may comprise a resource security component 122-3. The resource security component 122-3 may be operative to manage retrieval of access controls for the requested resource object 142-b and set of interrelated resource objects. The embodiments are not limited in this context.

In various embodiments, resource origin component 122-2 may be operative on processor circuit 102 to identify one or more resource objects 142-b related to the resource object 142-b from the set of interrelated resource objects 142-b, retrieve an access control for one of the related resource objects, and determine that an access control for a related resource object is the authorization origin. In some such embodiments, the set of interrelated resource objects may comprise a resource object hierarchy, as described in more detail with reference to FIG. 3. In various embodiments, resource origin component 122-2 may be operative to request access to the access controls for the requested resource object 142-b and interrelated resource objects, and resource security component 122-3 may be operative to retrieve the access controls for the requested resource object 142-b and set of interrelated resource objects. The embodiments are not limited in this context.

In various embodiments, resource origin component 122-2 may be operative on processor circuit 102 to determine that a default access control is the authorization origin 130. This may occur, for example, where no other authorization origin 130 is identified. The embodiments are not limited in this context.

Figure 2:
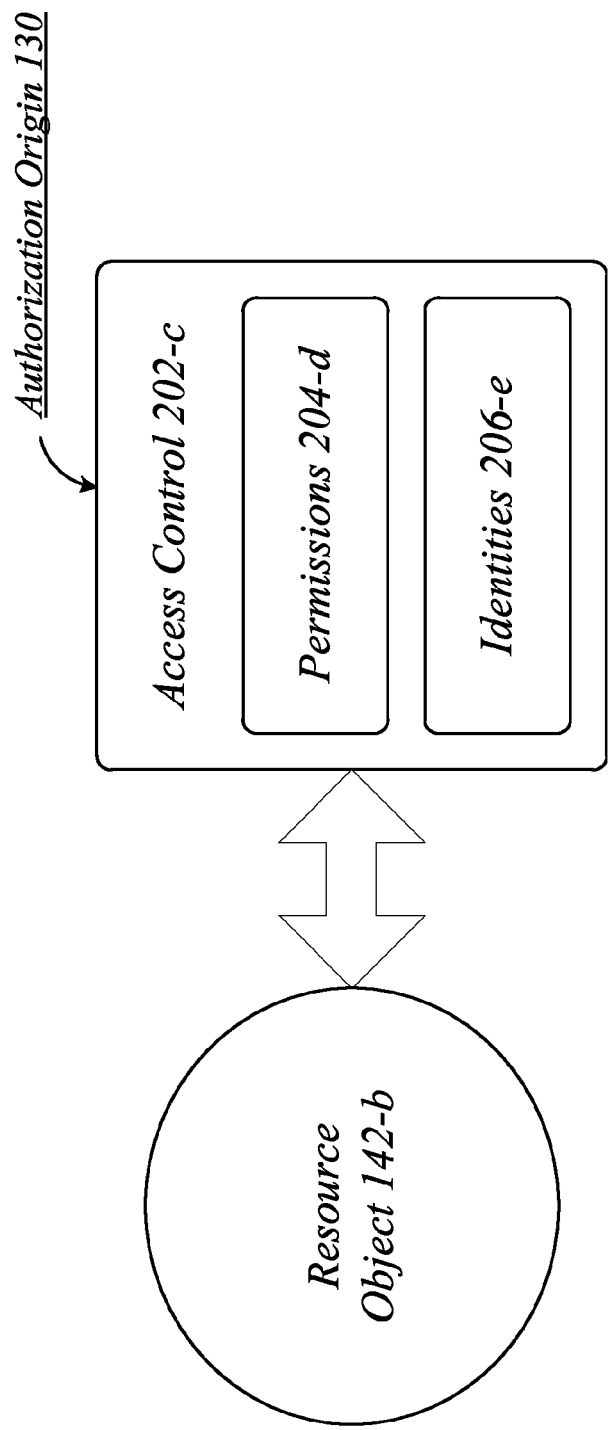
FIG. 2 illustrates an embodiment of a first logic diagram.

FIG. 2 illustrates an embodiment of a first logic diagram 200, which depicts an example of an authorization origin 130 of a resource object 142-b. As shown in FIG. 2, an authorization origin 130 of a resource object 142-b may comprise one or more access controls 202-c. An access control 202-c may comprise a set of one or more permissions 204-d arranged to control access to resource object 142-b based on an identity 206-e. The embodiments are not limited in this context.

Figure 3:
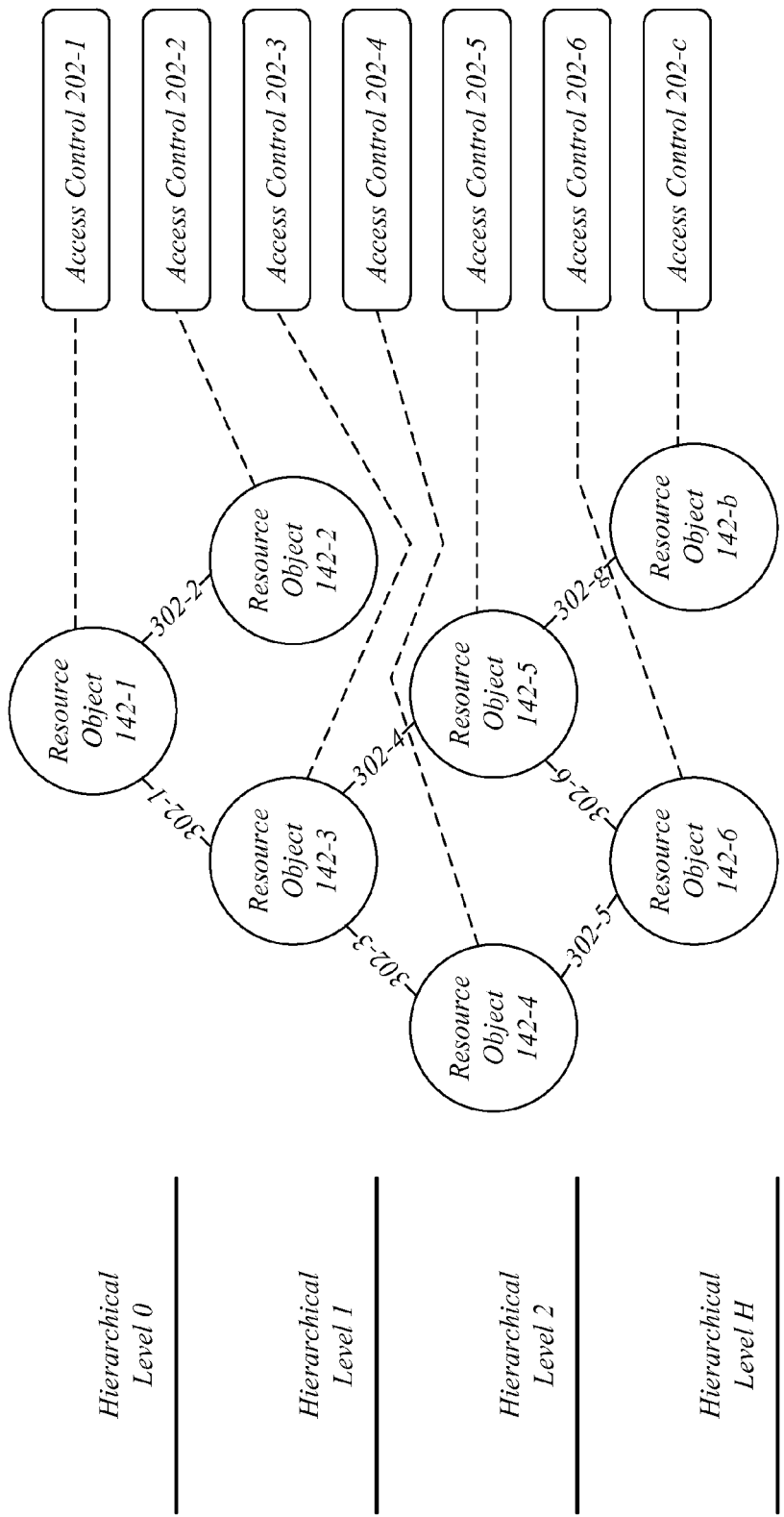
FIG. 3 illustrates an embodiment of a first resource object hierarchy.

FIG. 3 illustrates an embodiment of a first resource object hierarchy 300. As shown in FIG. 3, resource object hierarchy 300 comprises resource objects 142-1, 142-2, 142-3, 142-4, 142-5, 142-6, and 142-b. The various resource objects 142-b of resource object hierarchy 300 may reside on multiple hierarchical levels 0 to H, where H represents any positive integer. For example, as shown in FIG. 3, resource object 142-1 resides on hierarchical level 0, resource objects 142-2 and 142-3 reside on hierarchical level 1, resource objects 142-4 and 142-5 reside on hierarchical level 2, and resource objects 142-6 and 142-b reside on hierarchical level H. The hierarchical level 0 may sometimes be referred to as a "root" level. The various resource objects 142-b of resource object hierarchy 300 may be connected by various inheritance relationships 302-g. For example, resource object 142-3 is connected to resource object 142-1 by inheritance relationship 302-1. In some embodiments, inheritance relationships 302-g may indicate parent/child relationships between resource objects. More particularly, a particular inheritance relationship may indicate that a resource object on a lower hierarchical level is a child of a parent resource object on a higher hierarchical level, and inherits from that parent resource object. For example, inheritance relationship 302-1 may indicate that resource object 142-3 is a child of resource object 142-1, and inherits from resource object 142-1. The various resource objects of resource object hierarchy 300 may have various associated access controls. For example, in FIG. 3, access controls 202-1, 202-2, 202-3, 202-4, 202-5, 202-6, and 202-c are associated with resource objects 142-1, 142-2, 142-3, 142-4, 142-5, 142-6, and 142-b, respectively. The embodiments are not limited in this context.

Figure 4:
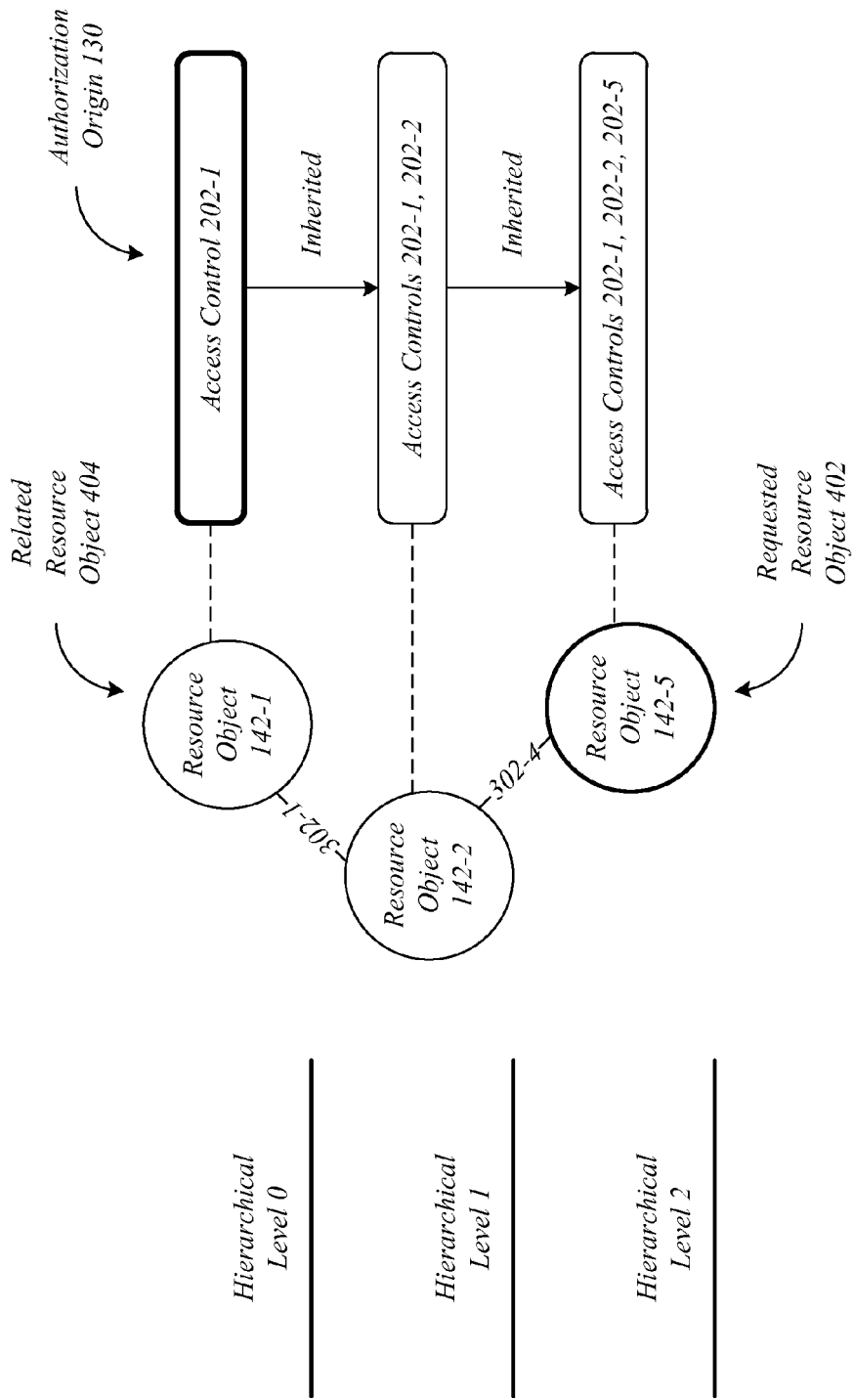
FIG. 4 illustrates an embodiment of a second resource object hierarchy.

FIG. 4 illustrates a subset of the resource object hierarchy 300. More particularly, FIG. 4 illustrates a portion of the resource object hierarchy 300 that comprises the hierarchical levels, inheritance relationships, and access controls that are applicable to resource objects 142-1, 142-2, and 142-5. As shown in FIG. 4, resource object 142-2 is a child of resource object 142-1 by virtue of inheritance relationship 302-1. In turn, resource object 142-5 is a child of resource object 142-2 by virtue of inheritance relationship 302-4. Access control 202-1 is directly associated with resource object 142-1, indirectly associated with resource object 142-2 by virtue of inheritance relationship 302-1, and indirectly associated with resource object 142-5 by virtue of inheritance relationships 302-1 and 302-4.

In response to an origin request 110 for a resource object 142-5, the resource origin component 122-2 of the software application 120 may identify the access control 202-1 of the resource object 142-1 of hierarchical level 0 as an authorization origin 130 of a permission on the resource object 142-5 of the hierarchical level 2. The resource object 142-5 may comprise a requested resource object 402. The resource object 142-1 may comprise a related resource object 404 that is related to the requested resource object 402 (e.g., a parent node). In this case, the authorization origin 130 may be considered an indirect or inherited authorization of the resource object 142-5, as the permission is inherited from a related resource object 142-1 which is a parent object of the resource object 142-5 within the resource object hierarchy 300.

Figure 5:
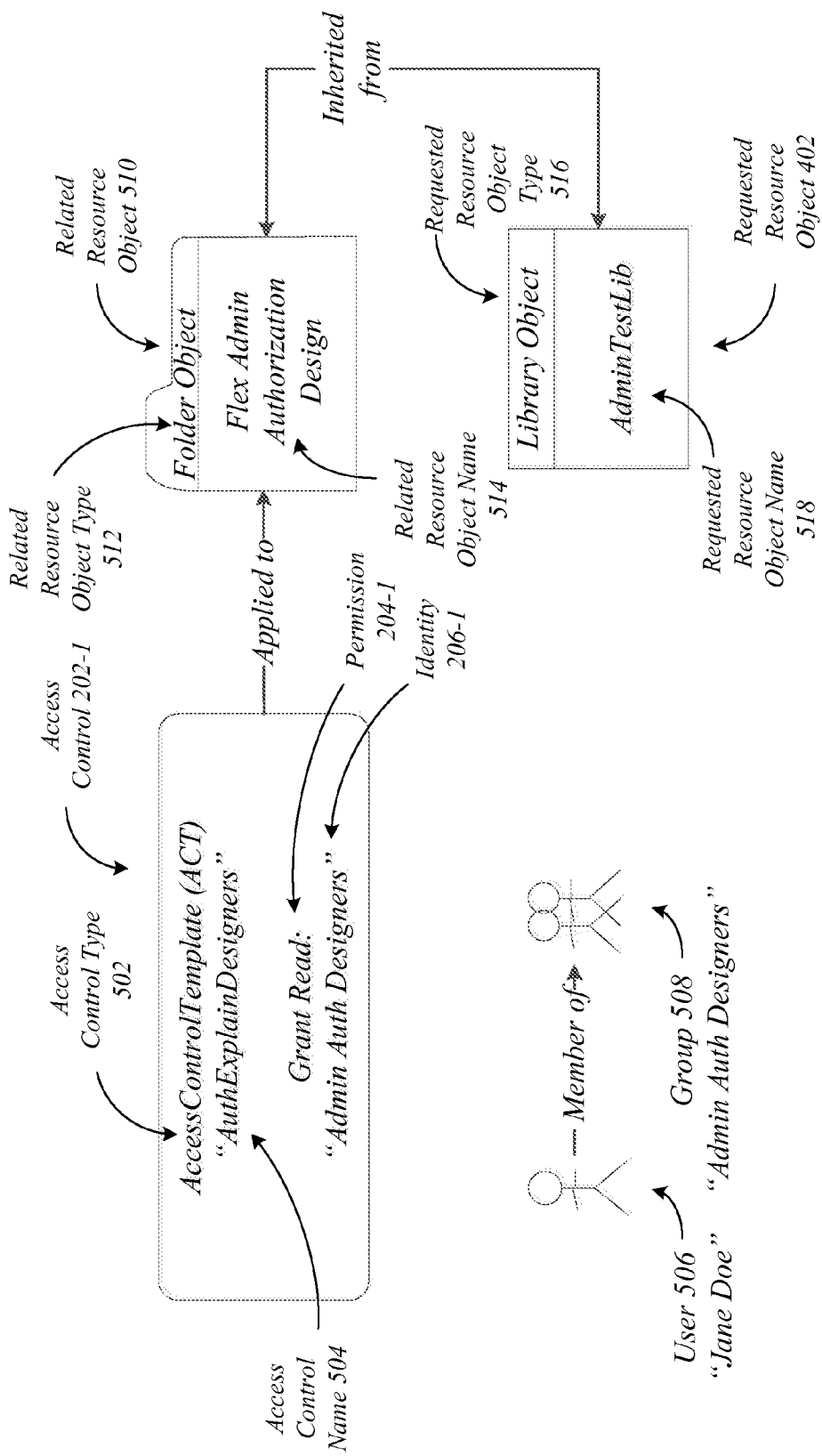
FIG. 5 illustrates an embodiment of a second logic diagram.

FIG. 5 illustrates an embodiment of a logic diagram 500. Logic diagram 500 illustrates an example of how authorization settings may be applied in a sample embodiment. As shown in FIG. 5, a user 506 is a member of a group 508. An access control 202-1 comprises a permission 204-1 which grants read access to an identity 206-1. In this example, access control 202-1 comprises an access control template (ACT), and thus permission 204-1 grants read access to identity 206-1 on any resource object to which it is applied. As further shown in FIG. 5, access control 202-1 is applied to related resource object 510, which comprises a folder object. Requested resource object 402 inherits from related resource object 510, and thus access control 202-1 is indirectly associated with requested resource object 402 by virtue of its inheritance from related resource object 510. User 506 is granted read access to requested resource object 402 according to access control 202-1, because user 506 is a member of group 508, and access control 202-1 grants read access to group 508. It may be appreciated that for sake of clarity this is relatively simple example of authorization settings within an access control system implemented by an organization, such as a business entity. In practice, a business entity may have massive numbers of resource objects 142-b and access controls 202-c in layers of nested configurations, thereby leading to highly complex and interrelated access control structures.

Figure 6:
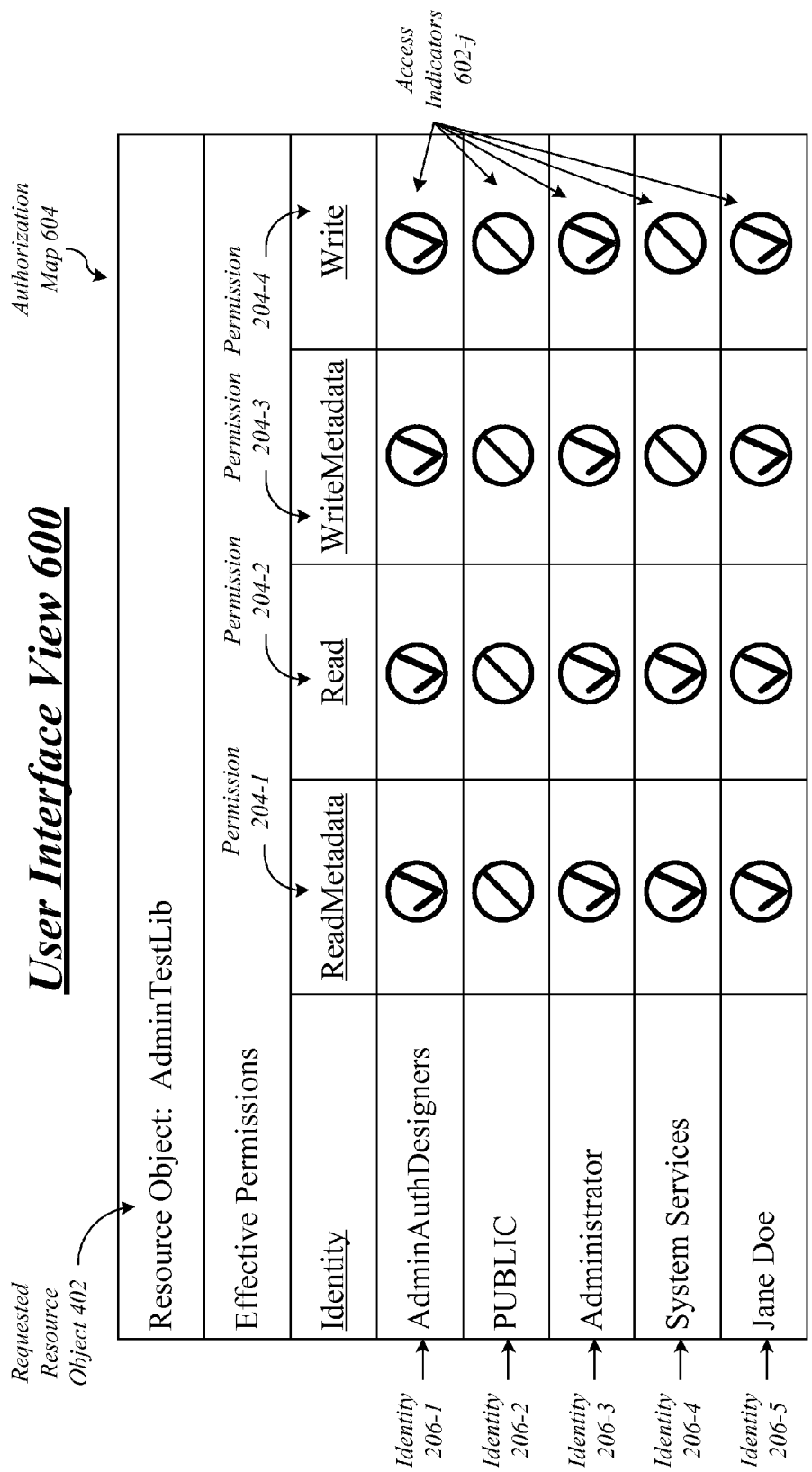
FIG. 6 illustrates an embodiment of a first user interface view.

FIG. 6 illustrates an embodiment of a first user interface view 600. As shown in FIG. 6, user interface view 600 illustrates an authorization map 604 arranged to identify a requested resource object 402, and indicate effective permissions that apply to requested resource object 402 for each combination of identity and permission from among multiple identities and multiple permissions. The authorization map 604 provides a quick, comprehensive, and intuitive way to convey authorization information to a user, such as an administrator. The user may then select, manipulate and interact with various user interface elements of the authorization map 604 to retrieve more authorization information, such as an authorization origin 130.

As shown in FIG. 6, user interface view 600 comprises a table with rows corresponding to identities 206-1, 206-2, 206-3, 206-4, and 206-5, and columns corresponding to permissions 204-1, 204-2, 204-3, and 204-4. At each row/column intersection, user interface view comprises an access indicator 602-j that indicates whether the type of access corresponding to that column has been granted to the identity corresponding to that row. For example, user interface view 600 comprises a grant access indicator (e.g., icon of a checkmark) at the intersection of the "AdminAuthDesigners" row with the "ReadMetadata" column. This indicates that identity 206-1 (AdminAuthDesigners) is granted read access to metadata by permission 204-1. In another example, user interface view 600 comprises a deny access indicator (e.g., icon of a circle with a slash) at the intersection of the "Public" row with the "ReadMetadata" column. This indicates that identity 206-2 (Public) is denied read access to metadata by permission 204-1.

Figure 7A:
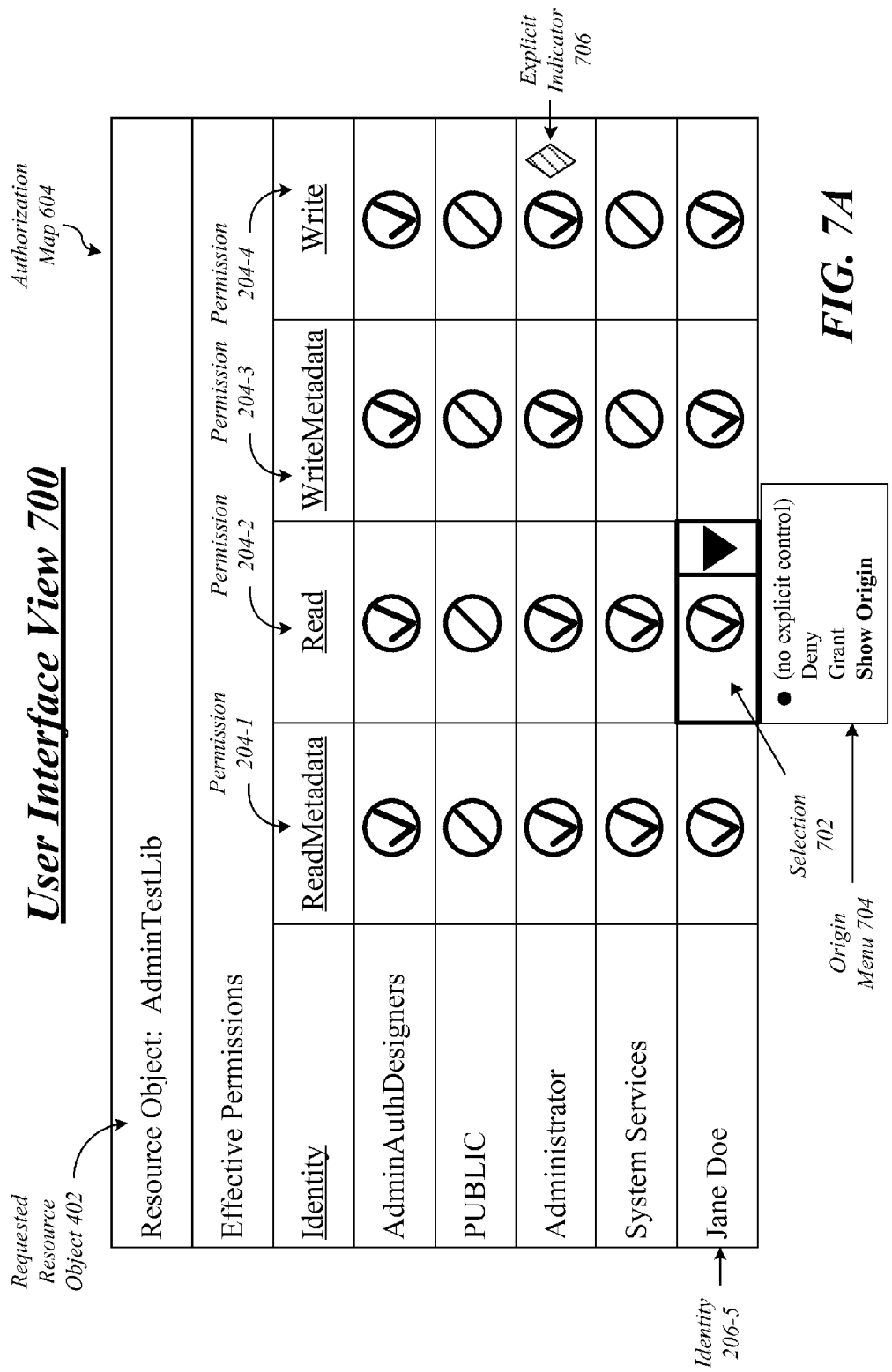
FIG. 7A illustrates an embodiment of a second user interface view.

FIG. 7A illustrates a user interface view 700. Similarly to user interface view 600 in FIG. 6, user interface view 700 comprises multiple identities, multiple permissions applied to the multiple identities, and multiple access indicators indicating the types of access granted to the various identities according to the various permissions.

User interface view 700 also comprises an explicit indicator 706. Explicit indicator 706 may indicate that the type of access corresponding to the column in which explicit indicator 706 resides has been explicitly granted or denied to the identity corresponding to the row in which explicit indicator 706 resides.

User interface view 700 further comprises origin menu 704. As shown in FIG. 7A, a selection 702 of a user interface element of the authorization map 604 may cause an origin menu 704 to appear in the authorization map 604. The origin menu 704 may comprise, for example, a drop-down box with multiple menu options. These may include a "No Explicit Control" option, a "Deny" option, a "Grant" option, and a "Show Origin" option. When the "Show Origin" option is selected, as indicated by its bolded properties, authorization information may be displayed that explains the basis for the authorization setting with respect to the type of access corresponding to the column in which origin menu 704 resides and the identity corresponding to the row in which origin menu 704 resides, which in this example is identity 206-5 and permission 204-2.

Figure 7B:
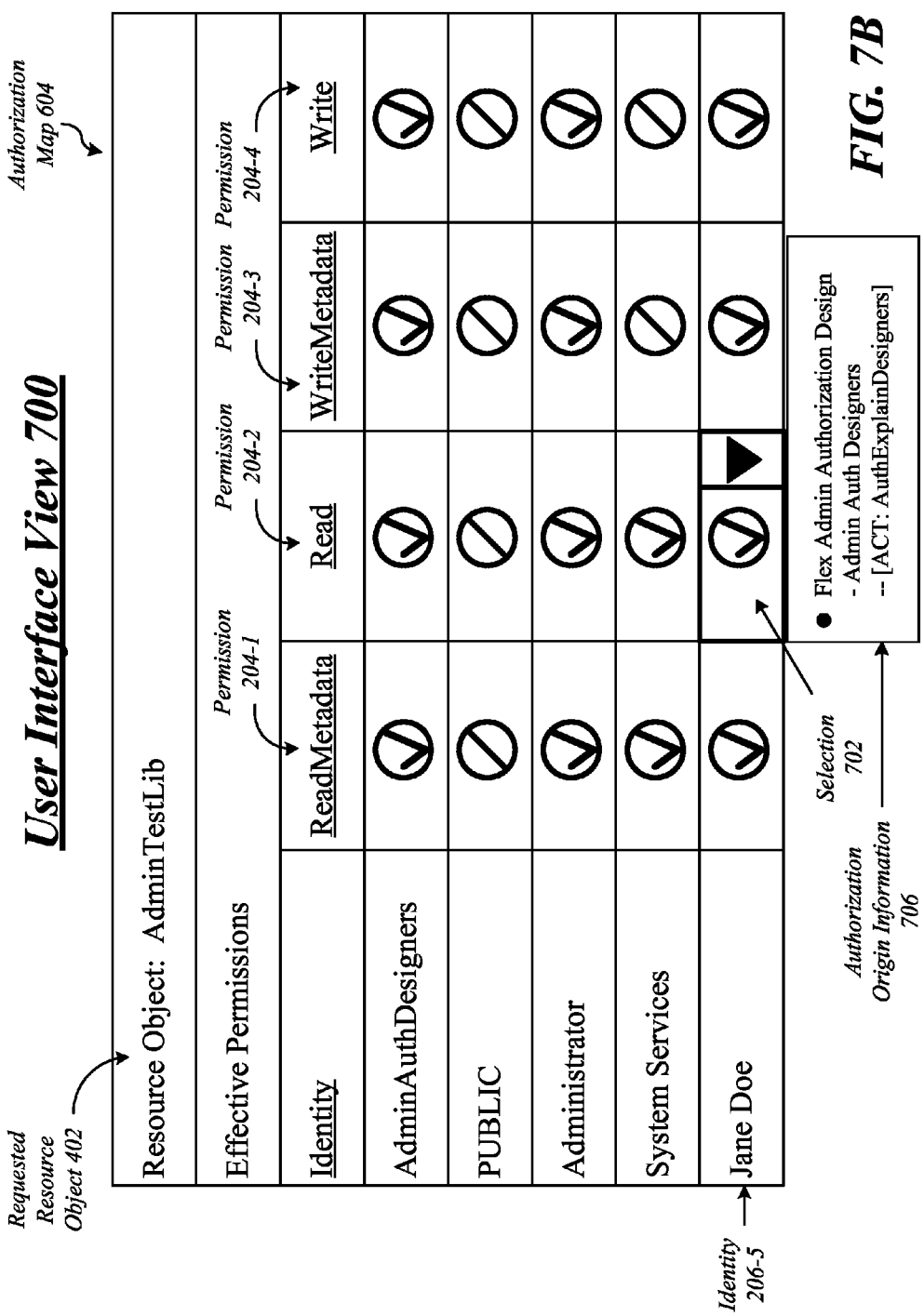
FIG. 7B illustrates an embodiment of a third user interface view.

FIG. 7B illustrates a different state of user interface view 700. The embodiment of FIG. 7B is an example the appearance of the user interface view 700 after the "Show Origin" option is selected from the origin menu 704 in FIG. 7A. In FIG. 7B, user interface view 700 comprises authorization origin information 706, which includes information pertaining to the basis for the authorization setting applied in the cell of selection 702. Particularly, authorization origin information 706 may indicate that the requested resource object 402 ("AdminTestLib") inherits from the "Flex Admin Authorization Design" folder, the identity 206-5 has membership in the "Admin Auth Designers" group, and the access control template "AuthExplainDesigners" has been applied to the related resource object 510 having a related resource object type 512 of a folder object and a related resource object name 514 of "Flex Admin Authorization Design." Other types and expression of authorization origin information 706 may be used for a given implementation, and the embodiments are not limited in this context.

Figure 8:
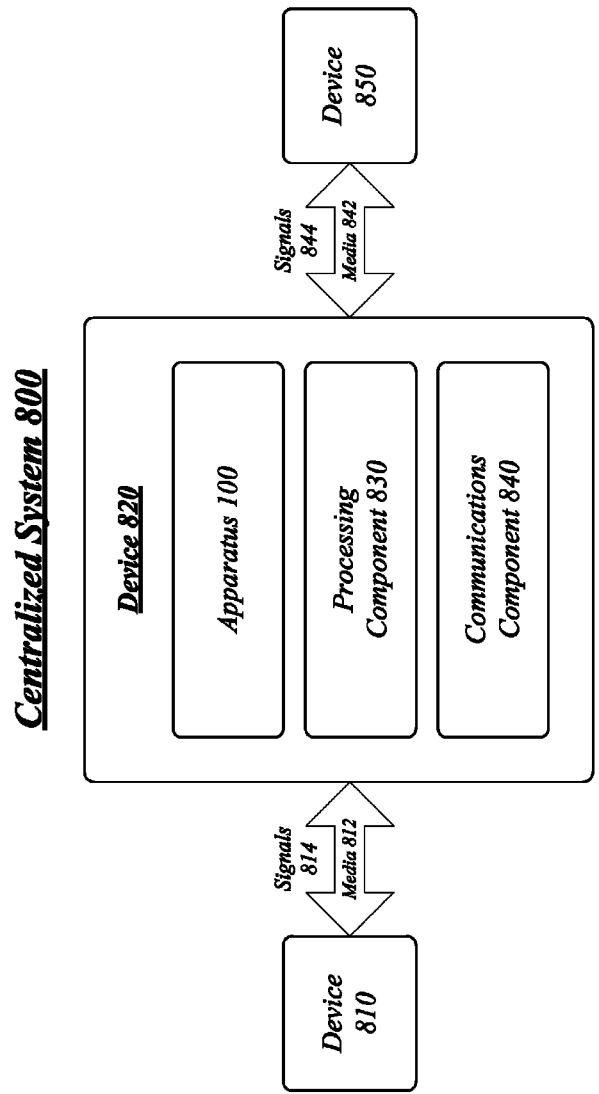
FIG. 8 illustrates an embodiment of a centralized system for the apparatus of FIG. 1.

FIG. 8 illustrates a block diagram of a centralized system 800. The centralized system 800 may implement some or all of the structure and/or operations for the apparatus 100 in a single computing entity, such as entirely within a single device 820.

The device 820 may comprise any electronic device capable of receiving, processing, and sending information for the apparatus 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a super-computer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 820 may execute processing operations or logic for the apparatus 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 820 may execute communications operations or logic for the apparatus 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812, 842 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 820 may communicate with other devices 810, 850 over a communications media 812, 842, respectively, using communications signals 814, 844, respectively, via the communications component 840. The devices 810, 850 may be internal or external to the device 820 as desired for a given implementation.

As shown in FIG. 8, the apparatus 100 may be implemented in a single device, such as the device 820. For instance, the apparatus 100 may be implemented in a server of a private network for an organization, such as an intranet of a business entity. In this case, the apparatus 100 may retrieve access control information from the devices 810, 850, which may represent other nodes of the private network. The device 820 itself and/or the apparatus 100 implemented by the device 820 may have restricted access to individuals authorized to view and/or modify access control systems for the business entity. For instance, access to the device 820 or the apparatus 100 may be limited to system administrators of the private network.

Figure 9:
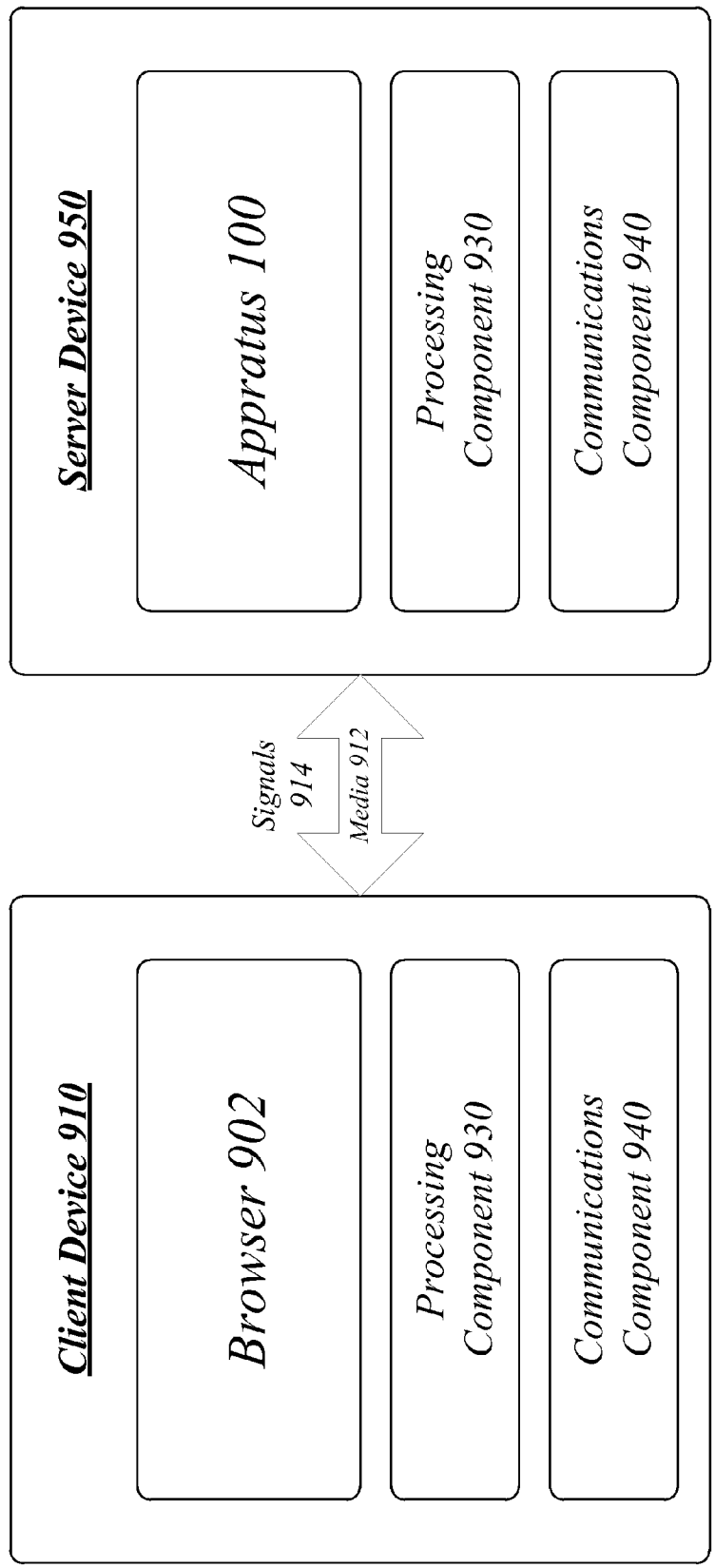
FIG. 9 illustrates an embodiment of a distributed system for the apparatus of FIG. 1.

FIG. 9 illustrates a block diagram of a distributed system 900. The distributed system 900 may distribute portions of the structure and/or operations for the apparatus 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a client device 910 and a server device 950. In general, the client device 910 and the server device 950 may be the same or similar to the client device 820 as described with reference to FIG. 8. For instance, the client system 910 and the server system 950 may each comprise a processing component 930 and a communications component 940 which are the same or similar to the processing component 830 and the communications component 840, respectively, as described with reference to FIG. 8. In another example, the devices 910, 950 may communicate over a communications media 912 using communications signals 914 via the communications components 940.

As shown in FIG. 9, the apparatus 100 may be implemented in a client-server architecture, where the apparatus 100 is implemented by the device 950 which is accessible by the client device 910 via a web browser 902. Similar to the centralized system 800, the apparatus 100 may be implemented in a server of a private network for an organization, such as an intranet of a business entity. In this case, the apparatus 100 may retrieve access control information from the devices 810, 850, which may represent other nodes of the private network. The server device 950 itself and/or the apparatus 100 implemented by the server device 950 may have restricted access to individuals authorized to view and/or modify access control systems for the business entity. For instance, access to the device 950 or the apparatus 100 may be limited to system administrators of the private network. Furthermore, the authorized users may access the apparatus 100 remotely via the web browser 902. Examples of web browser 902 may include any commercial web browsers, including without limitation Mozilla Firefox®, Google® Chrome®, Microsoft® Internet Explorer®, Opera Software Opera®, Apple® Safari®, and others. The embodiments are not limited in this context.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 10 illustrates one embodiment of a logic flow 1000. The logic flow 1000 may be representative of some or all of the operations executed by one or more embodiments described herein.

At block 1002, a request for an authorization origin of a resource object may be received, the authorization origin comprising an access control with a permission arranged to control access to the resource object based on an identity. For example, the request processor component 122-1 of the apparatus 100 of FIG. 1 may receive an origin request 110 for an authorization origin 130 of a resource object 142-$b$. The origin request 110 may be generated in response to a user selection made via the user interface view 700, such as the "Show Origin" menu option of the origin menu 704, for example.

At block 1004, the authorization origin of the resource object from a set of interrelated resource objects and associated access controls may be identified. For example, the request processor component 122-1 may send a request to the resource origin component 122-2 to identify an authorization origin 130 for a resource object 142-$b$ as indicated by the origin request 110.

The request processor component 122-1 may send an identification request to the resource origin component 122-2 to access controls 202-$c$ for a requested resource object 402 and any interrelated resource objects 142-$b$ related to the requested resource object 402. The resource origin component 122-2 may initiate operations to identify an authorization origin 130 for the requested resource object 402. To perform identification, the resource origin component 122-2 may first need to seek access to a data access security system protecting access information for the resource objects 142-$b$. In such cases, the resource origin component 122-2 may send an access request to the resource security component 122-3.

The resource security component 122-3 may manage and control security access to access controls 202-$c$ for one or more of the resource objects 142-$b$. The resource security component 122-3 may comprise or be implemented as a data access security system for accessing information stored within a data storage unit or units, such as data store 140, for example. The stored information is retrieved through resource objects 142-$b$ which are interconnected through a complex set of relationships or associations. The associations may define conceptual relationships between an instance of one class and an instance of another class. For example, objects may be associated to higher level container objects, such as a column object having an association to the table within which it is found as well as to other objects. The table object may itself have multiple associations, such as to libraries and trees within which it is located. In this respect, a resource object 142-$b$ may have associations to multiple resource objects 142-$b$ in a hierarchical manner, such as the resource object hierarchy 300 described with reference to FIG. 3.

The resource origin component 122-2 may furnish a request for information located in the data store 140. The resource origin component 122-2 may be asking for any type of information, such as information about company employee salaries or positions. The resource security component 122-3 receives the request and examines whether the resource origin component 122-2 should be granted or denied access to all or any of the requested information as well as what kinds of operations the resource origin component 122-2 may perform on that information.

The resource security component 122-3 processes the request by constructing a virtual containment boundary around the requested resource object 402 that is involved in the request. The containment boundary determines resource objects 142-$b$ that act as containers or parents where these parents may have applied access controls that determine an authorization decision when access controls on the requested resource object 402 do not. Inheritance rules help form the containment boundary by specifying what object associations are involved in constructing the containment boundary. Because a requested resource object 402 may have multiple associated resource objects 142-$b$, inheritance rules specify which object associations are to be used in constructing the containment boundary. Because a requested resource object 402 may have multiple associated resource objects 142-$b$, the requested resource object 402 may have multiple inheritance parents. The requested resource object 402 may have one or more parents through a class inheritance hierarchy as defined by a set of inheritance rules. Through the inheritance rules, the authorization decisions that result from evaluating access controls set on parent objects according to parent class may be inherited by the requested resource object 402.

As an illustration, containment boundaries may be established for resource objects 142-$b$ by setting up inheritance rules based on object class that describe how to traverse from a requested resource object 402 of a class to the related resource object 142-$b$ with which it is associated. The security information that is obtained from traversing among resource objects 142-$b$ according to the inheritance rules is used to determine whether the resource origin component 122-2 should be granted or denied access to associated resource objects within the containment boundary. Accordingly, inheritance rules act as containment rules in determining which resource objects 142-$b$ are contained within the containment boundary based upon the requested resource object 402; and then access controls applied to the resource objects 142-$b$ (e.g., those "parent objects" within the parent hierarchy that defines the containment boundary) that specify whether or not access is granted or denied. It is worthy to note that the access controls may include a denied case since resource objects 142-$b$ can also inherit a deny decision.

In addition to looking up rules based on class associations to direct objects, the resource security component 122-3 may also examine inheritance rules resulting from the requested resource object 402 ancestor classes in the resource object hierarchy 300. Based upon the resource object hierarchy 300, child objects know from what parent object(s) they are to inherit. For example, a child object such as resource object 142-5 from a class inherits from a parent lineage of parent classes of resource objects 142-3, 142-1. The resource security component 122-3 is capable of evaluating the inheritance rules and aggregating security information through the resource object hierarchy 300 to make an authorization decision. A set of rules can be defined once on a parent class and affect all of its child classes. Optionally, child classes can augment inherited security or choose to ignore one or more of the inheritable rules from ancestor classes.

With such an approach, the resource security component 122-3 may identify or construct containment boundaries by setting up a series of rules, based upon class, that describe how to traverse from an object of that class to a related object from which it should acquire its security, as well as (if desired) based upon inheriting rules from ancestor classes in a class hierarchy tree.

Once the resource origin component 122-2 is granted access to resource objects 142-*b* stored in the data store 140, the resource origin component 122-2 initiate authorization identification operations to identity an authorization origin 130 for the requested resource object 402 using information and associations of the resource objects 142-*b*. For instance, the resource origin component 122-2 may retrieve an access control 202-*c* for the requested resource object 402, such as an access control 202-5 of a resource object 142-5 as provided in the previous example described with reference to FIG. 4. The resource origin component 122-2 may determine whether the access control 202-5 for the requested resource object 402 (e.g., resource object 142-5) is the authorization origin 130 for a given identity 206-*e*. If so, the authorization origin 130 is set to the access control 202-5. This is an example of a direct or explicit authorization.

If the access control 202-5 is not the authorization origin 130, the resource origin component 122-2 may identify one or more resource objects 142-*b* related to the requested resource object 402 from the set of interrelated resource objects 142-*b*. In one embodiment, the set of interrelated resource objects 142-*b* may comprise a resource object hierarchy, such as the resource object hierarchy 300, for example. The resource origin component 122-2 may then retrieve an access control 202-*c* for each of the related resource objects 142-*b*. For instance, the resource origin component 122-2 may retrieve an access control 202-1 for a resource object 142-1 which is a parent object of the resource object 142-5, thereby making it a related resource object 404. The resource origin component 122-2 may determine whether the access control 202-1 for the related resource object 404 (e.g., resource object 142-1) is the authorization origin 130 for a given identity 206-*e*. If so, the authorization origin 130 is set to the access control 202-1. This is an example of an indirect or inherited authorization. Some other examples of authorization identification operations may be described with reference to FIGS. 11-26.

After a complete inspection and analysis of the resource nodes 142-*b* of the resource object hierarchy 300, the resource origin component 122-2 may still fail to identify an access control 202-*c* for the resource nodes 142-*b* that is the authorization origin 130. In this case, the resource origin component 122-2 may determine an access control 202-*c* of a default access control, such as a default ACT for all of the related nodes 142-*b*, is the authorization origin 130. If so, the authorization origin 130 is set to the default access control. This is another example of an indirect authorization.

At block 1006, authorization origin information for the authorization origin may be retrieved. Once the authorization origin 130 is identified, the resource origin component 122-2 may retrieve authorization origin information 706 for authorization origin 130.

At block 1008, the authorization origin information may be presented in a user interface view. For example, the request processor component 122-1 and/or the resource origin component 122-2 may present authorization origin information 706 as part of an authorization map 604 in the user interface view 700. The authorization map 604 may comprise or present authorization origin information 706 for multiple resource objects 142-*b* and identities 206-*e*, as described with reference to FIGS. 7A, 7B. The embodiments are not limited to these examples.

Figure 13:
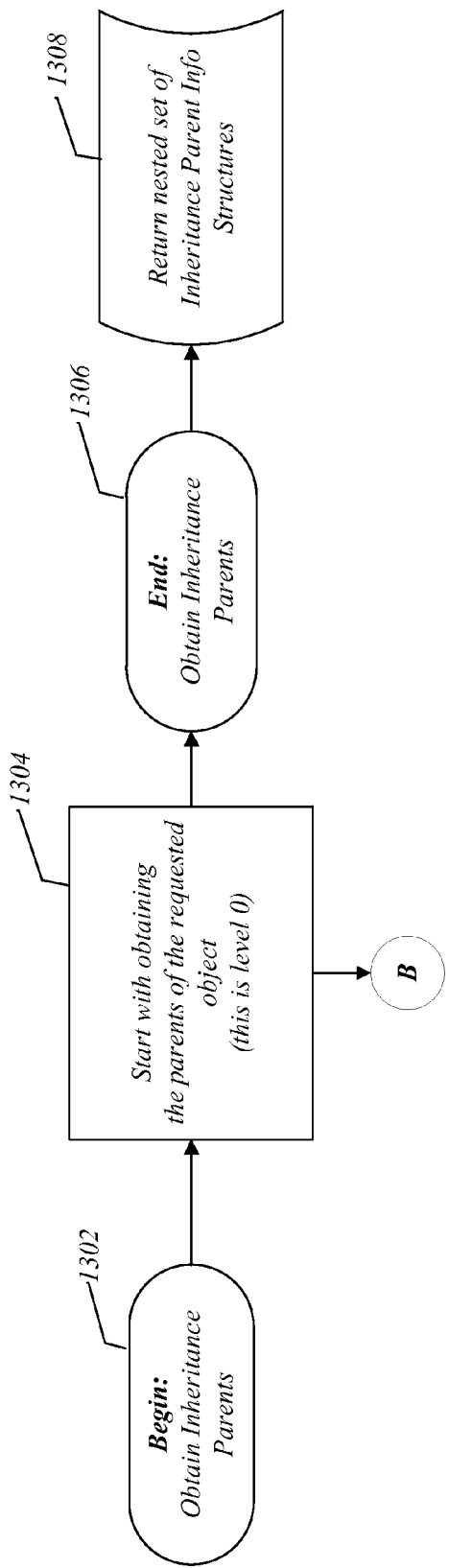
FIG. 13 illustrates an embodiment of a fourth logic flow for the apparatus of FIG. 1.
Figure 14:
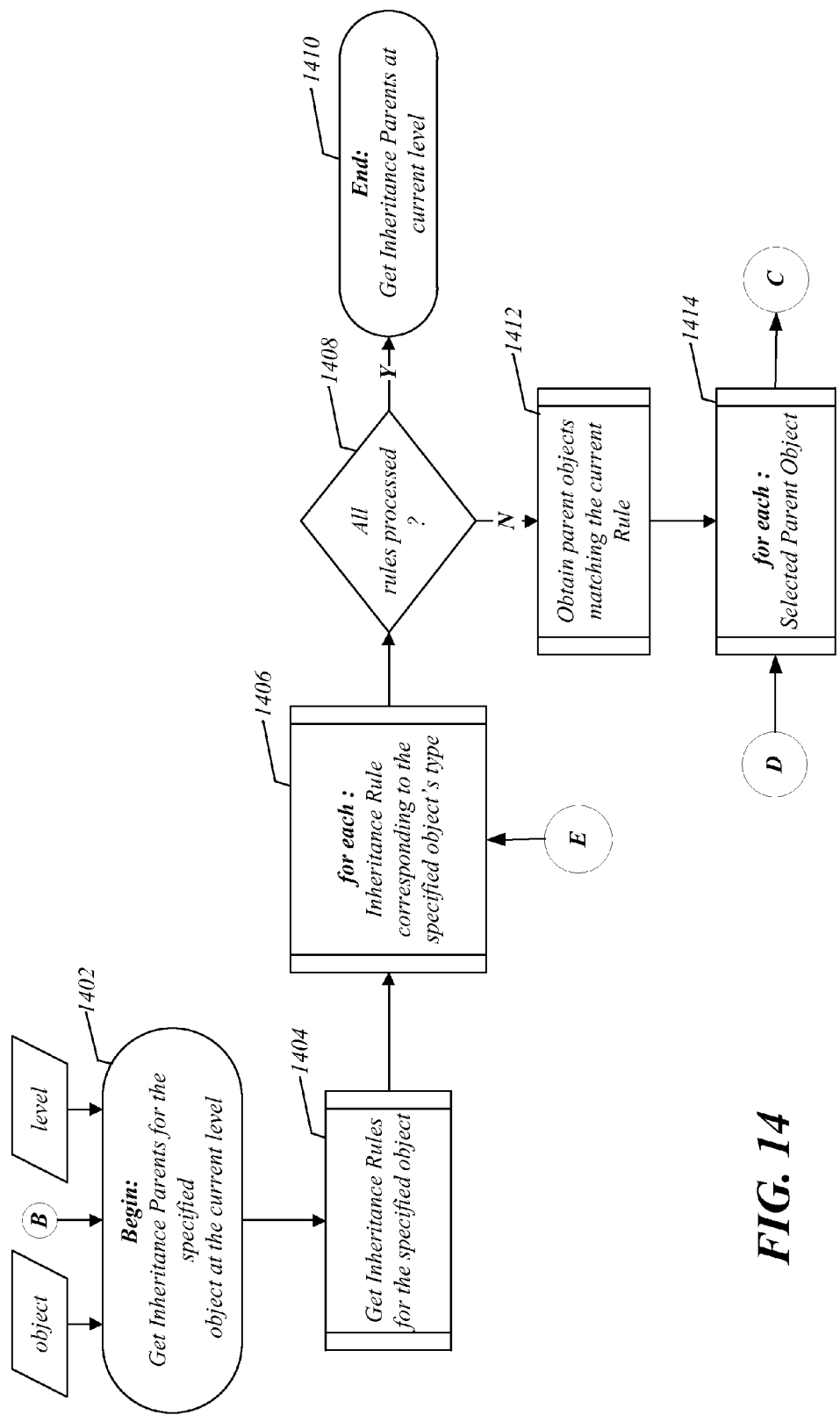
FIG. 14 illustrates an embodiment of a fifth logic flow for the apparatus of FIG. 1.
Figure 15:
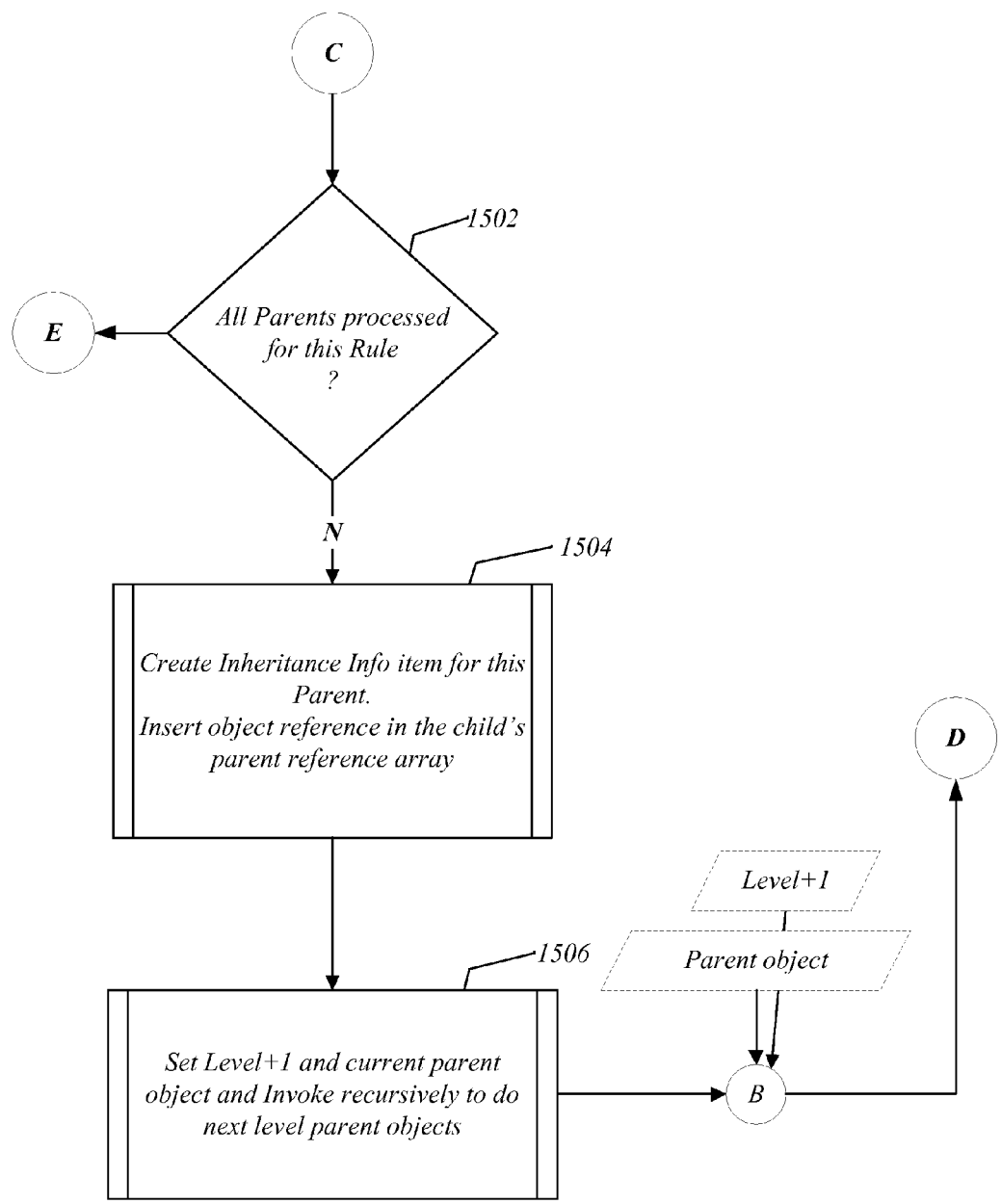
FIG. 15 illustrates an embodiment of a sixth logic flow for the apparatus of FIG. 1.

FIG. 11 illustrates one embodiment of a logic flow 1100. Logic flow 1100 may comprise a first portion of a process I. Process I may comprise a process for determining authorization origin details for a requested resource object. As shown in FIG. 11, logic flow 1100 may begin at 1120. At 1120, an inheritance parent information structure for the requested resource object may be retrieved. For example, resource origin component 122-2 of FIG. 1 may retrieve an inheritance parent information structure for a resource object 142-*b*. The inheritance parent information structure may indicate one or more parent resource objects from which the requested resource object inherits permission settings, which indicate whether to grant or deny specific permissions for specific identities via access controls set on one or more parent resource objects. The inheritance rules that define the associations needed to locate the parent resource objects are returned from process II along with references to the actual parent resource objects themselves. The operations performed at 1120 may comprise a process II, an example embodiment of which is illustrated in FIGS. 13 to 15.

At 1130, authorization information components for the requested resource object may be retrieved. For example, resource origin component 122-2 of FIG. 1 may retrieve authorization information components for a resource object 142-*b*. The authorization information components may comprise information regarding one or more permissions set on the requested resource object for one or more identities. The operations performed at 1130 may comprise a process III, an example embodiment of which is illustrated in FIGS. 16 to 20.

Flow may then pass to 1140, which may comprise a node A. Node A is included for ease of understanding, and indicates a point at which logic flow 1100 may connect with logic flow 1200 of FIG. 12 within process I.

Figure 12:
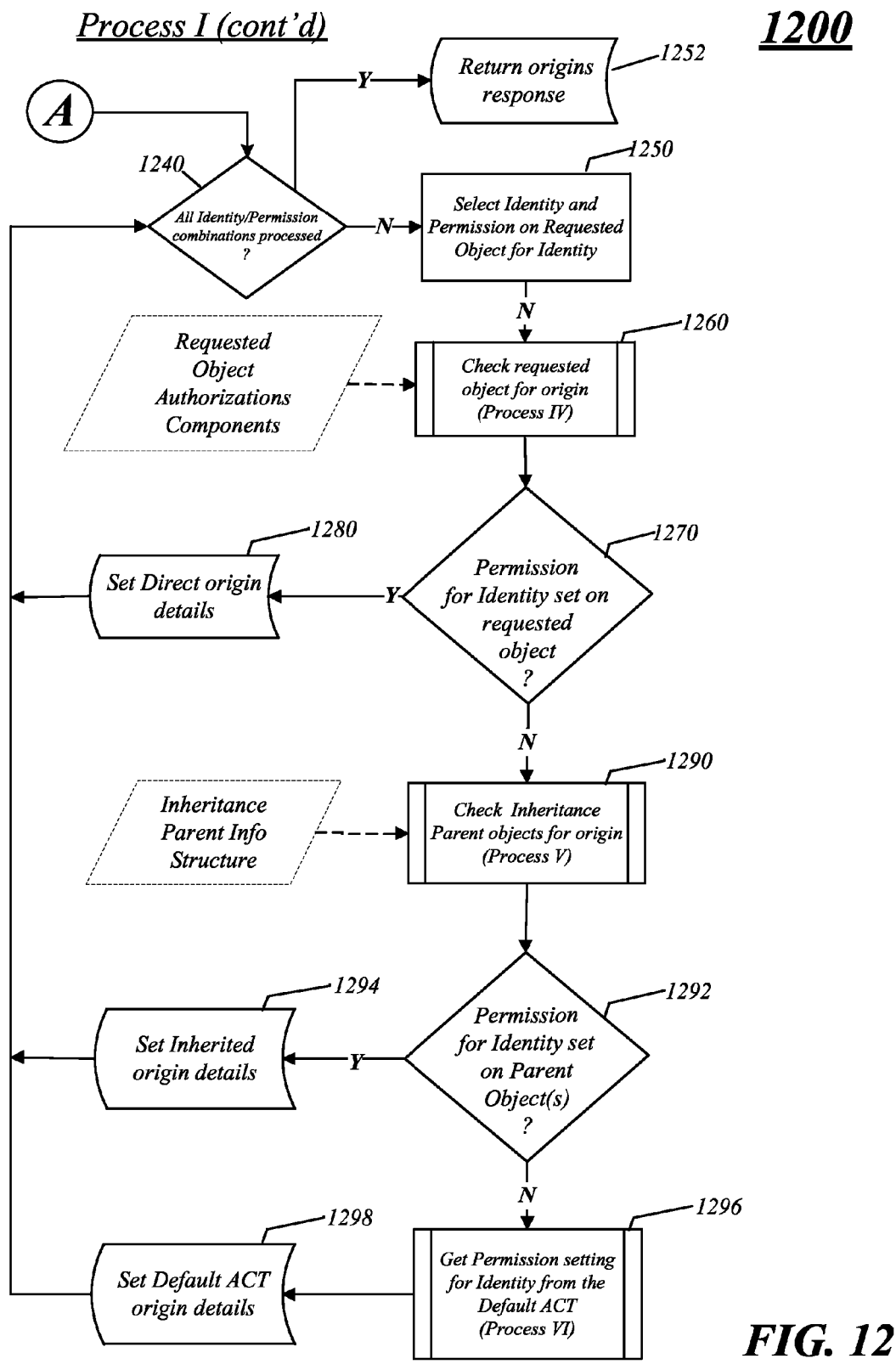
FIG. 12 illustrates an embodiment of a third logic flow for the apparatus of FIG. 1.

FIG. 12 illustrates one embodiment of a logic flow 1200. Logic flow 1200 may comprise a second portion of process I. Similarly to logic flow 1100, logic flow 1200 comprises a node A. Node A is included for ease of understanding, and indicates a point at which logic flow 1200 may connect with logic flow 1100 of FIG. 11 within process I. Flow within process I may pass from node A in logic flow 1100 to node A in logic flow 1200. Flow may then pass to 1240.

At 1240, it may be determined whether all permissions have been processed for all identities for which permissions 204-*d* are set on the requested resource object 402. For example, resource origin component 122-2 of FIG. 1 may determine whether all permissions 204-*d* have been processed for all identities 206-*e* for which permissions are set on a resource object 142-*b*.

If it is determined at 1240 that all possible combinations of identity and permission have been processed, flow may pass to 1252. At 1252, a response collection may be returned. The response collection may comprise accumulated authorization origin information for the requested resource object. For example, resource origin component 122-2 of FIG. 1 may return a response collection comprising accumulated authorization origin information for resource object 142-*b*.

If it is determined at 1240 that all possible combinations of identity and permission have not been processed, flow may pass to 1250. At 1250, an identity and a permission set on the requested resource object for that identity may be selected from among the authorization information components. For example, resource origin component 122-2 of FIG. 1 may select an identity 206-*e* and a permission 204-*d* that is set on a resource object 142-*b* for identity 206-*e*. Flow may then pass to 1260.

Figure 21:
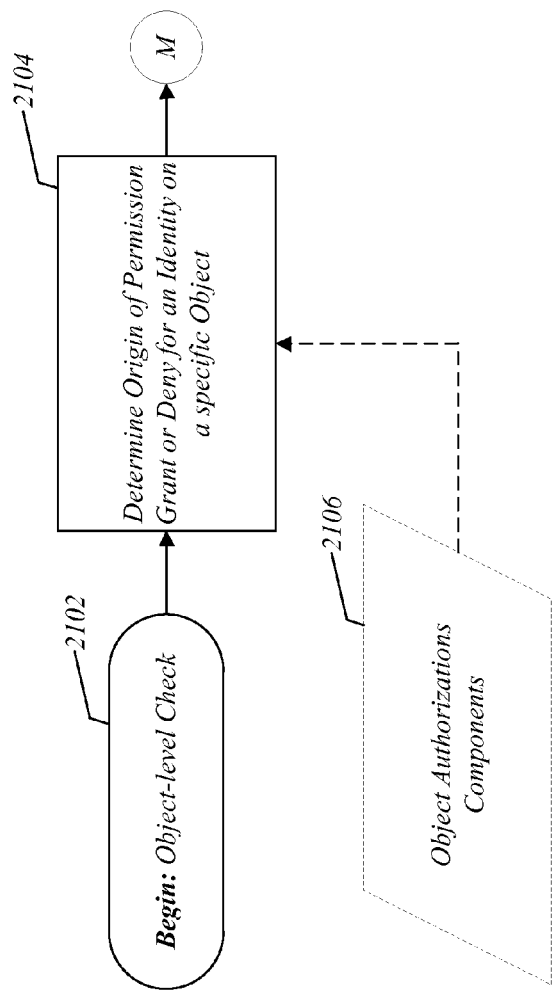
FIG. 21 illustrates an embodiment of a twelfth logic flow for the apparatus of FIG. 1.
Figure 22:
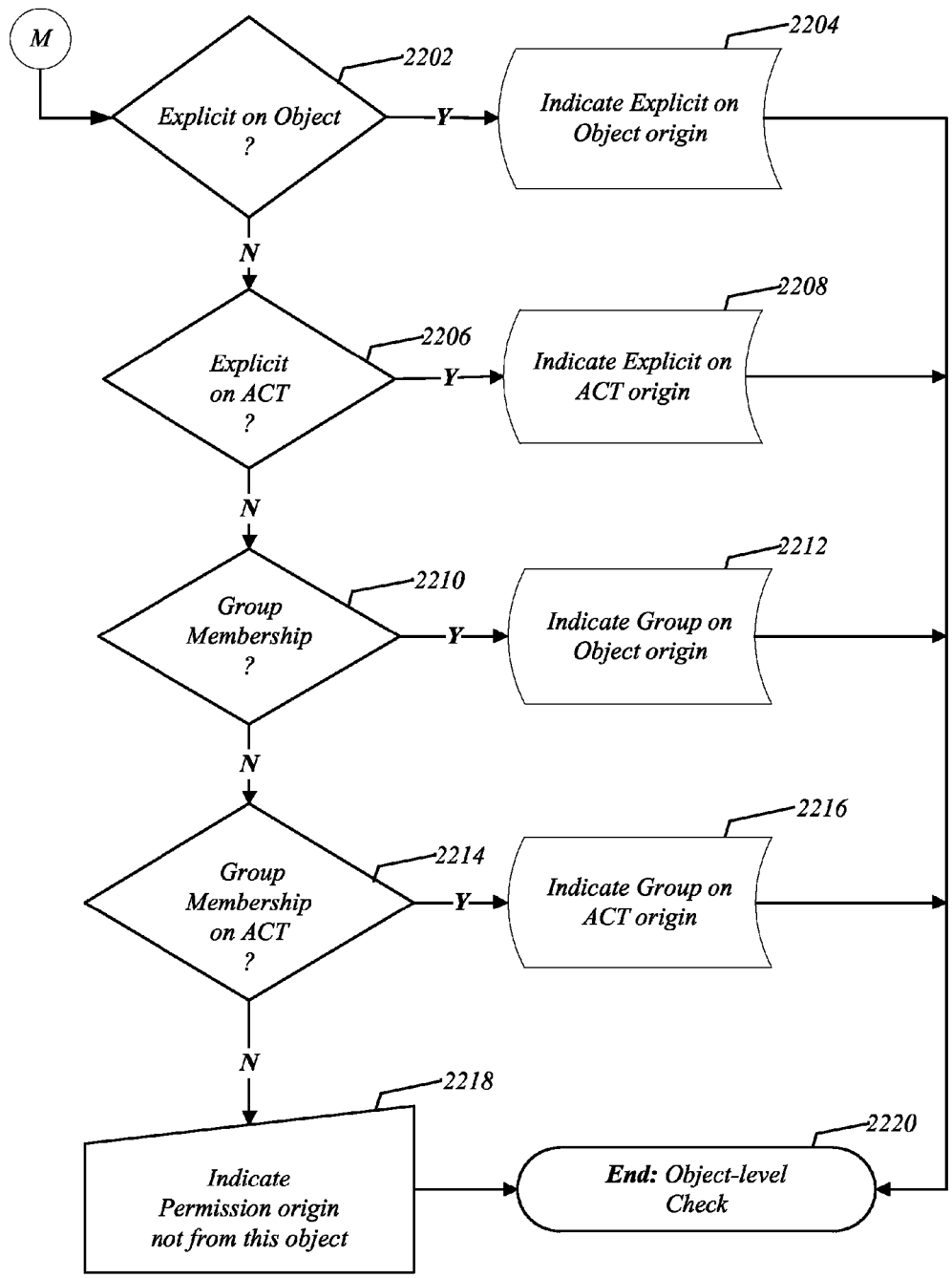
FIG. 22 illustrates an embodiment of a thirteenth logic flow for the apparatus of FIG. 1.

At 1260, it may be determined whether the selected permission for the selected identity originates from the requested resource object. For example, resource origin component 122-2 of FIG. 1 may determine whether the selected permission for the selected identity originates from resource object 142-*b*. The operations performed at 1260 may comprise a process IV, an example embodiment of which is illustrated in FIGS. 21 to 22. Flow may then pass to 1270.

At 1270, if it has been determined that the selected permission for the selected identity originates from the requested resource object, flow may then pass to 1280. At 1280, information may be added to the response collection indicating that the selected permission for the selected identity originates from the requested resource object. Flow may then pass back to 1240.

Figure 23:
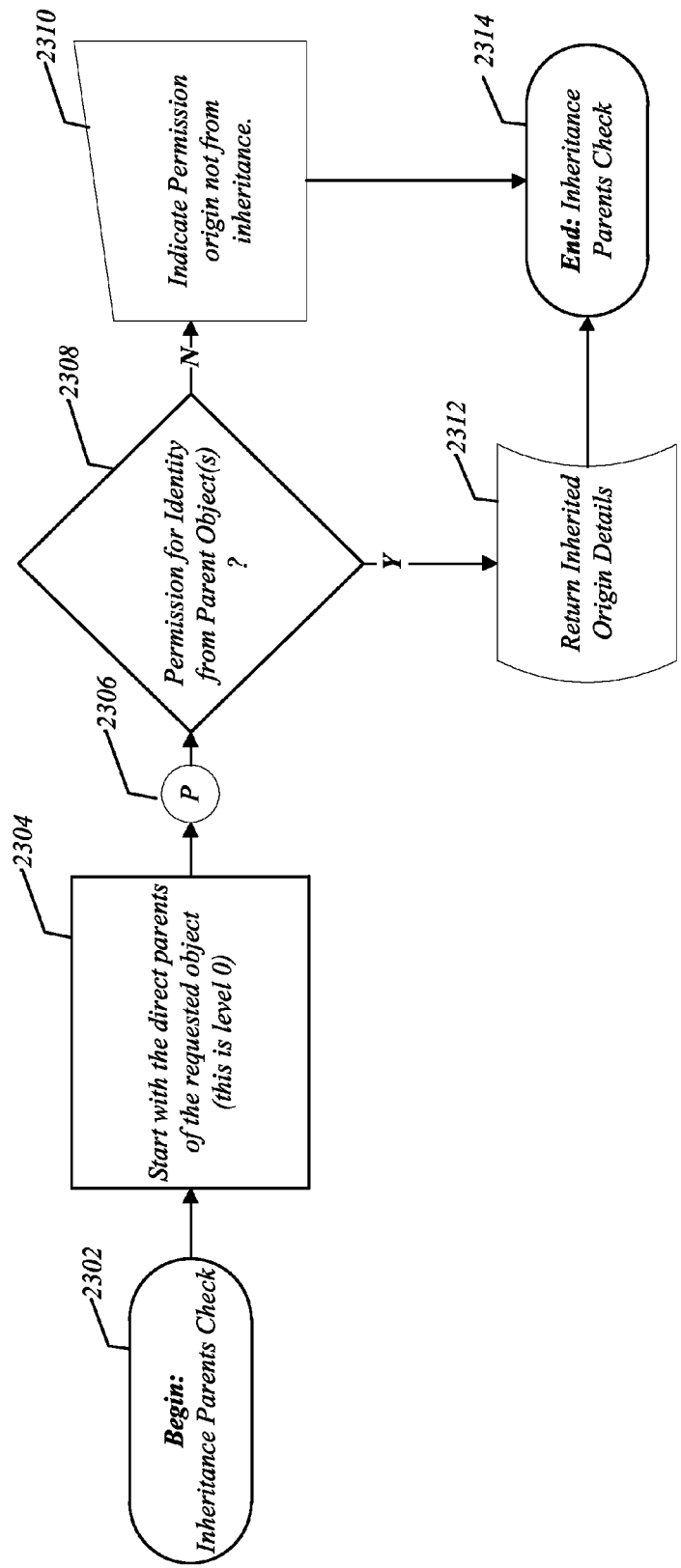
FIG. 23 illustrates an embodiment of a fourteenth logic flow for the apparatus of FIG. 1.
Figure 24:
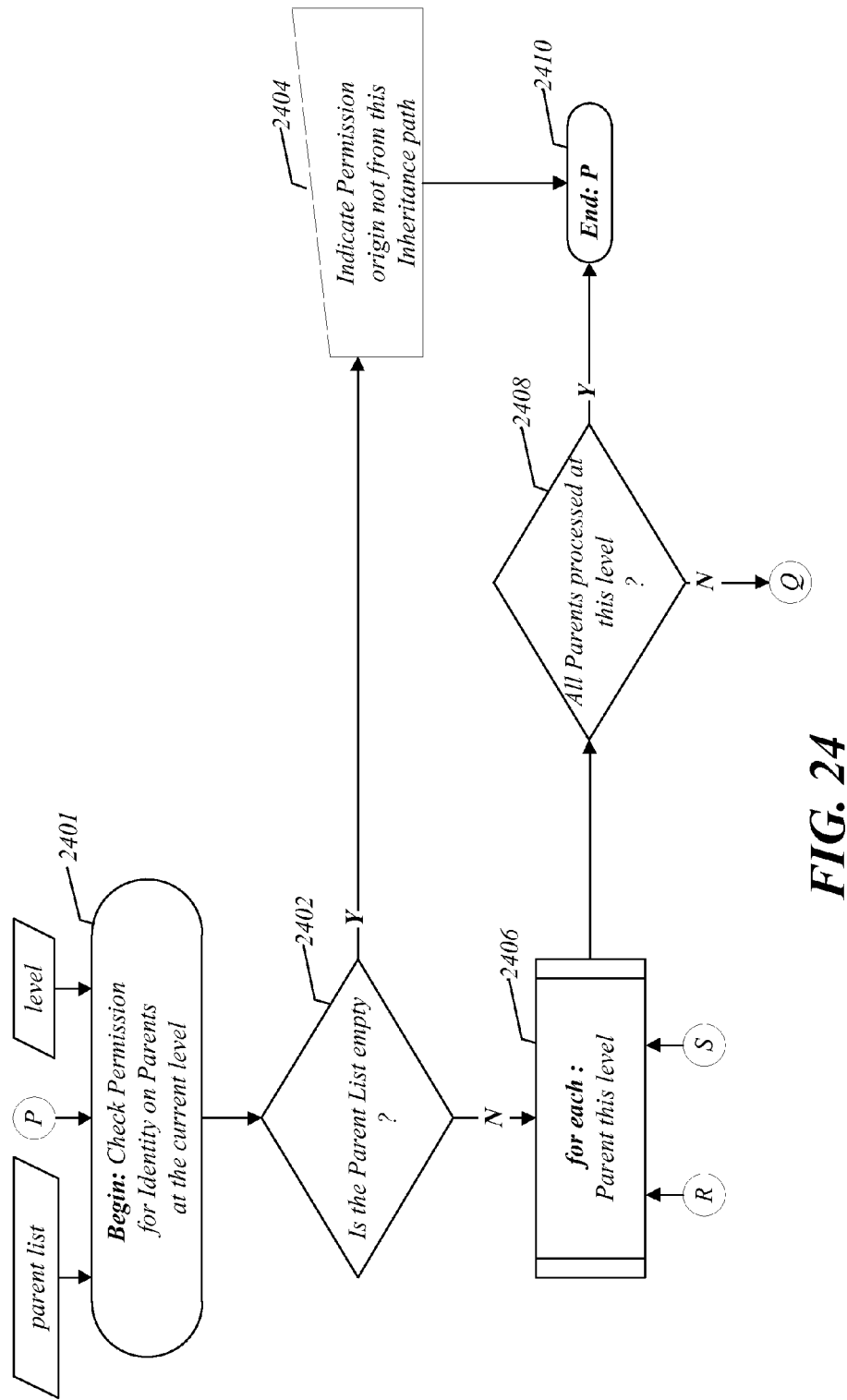
FIG. 24 illustrates an embodiment of a fifteenth logic flow for the apparatus of FIG. 1.
Figure 25:
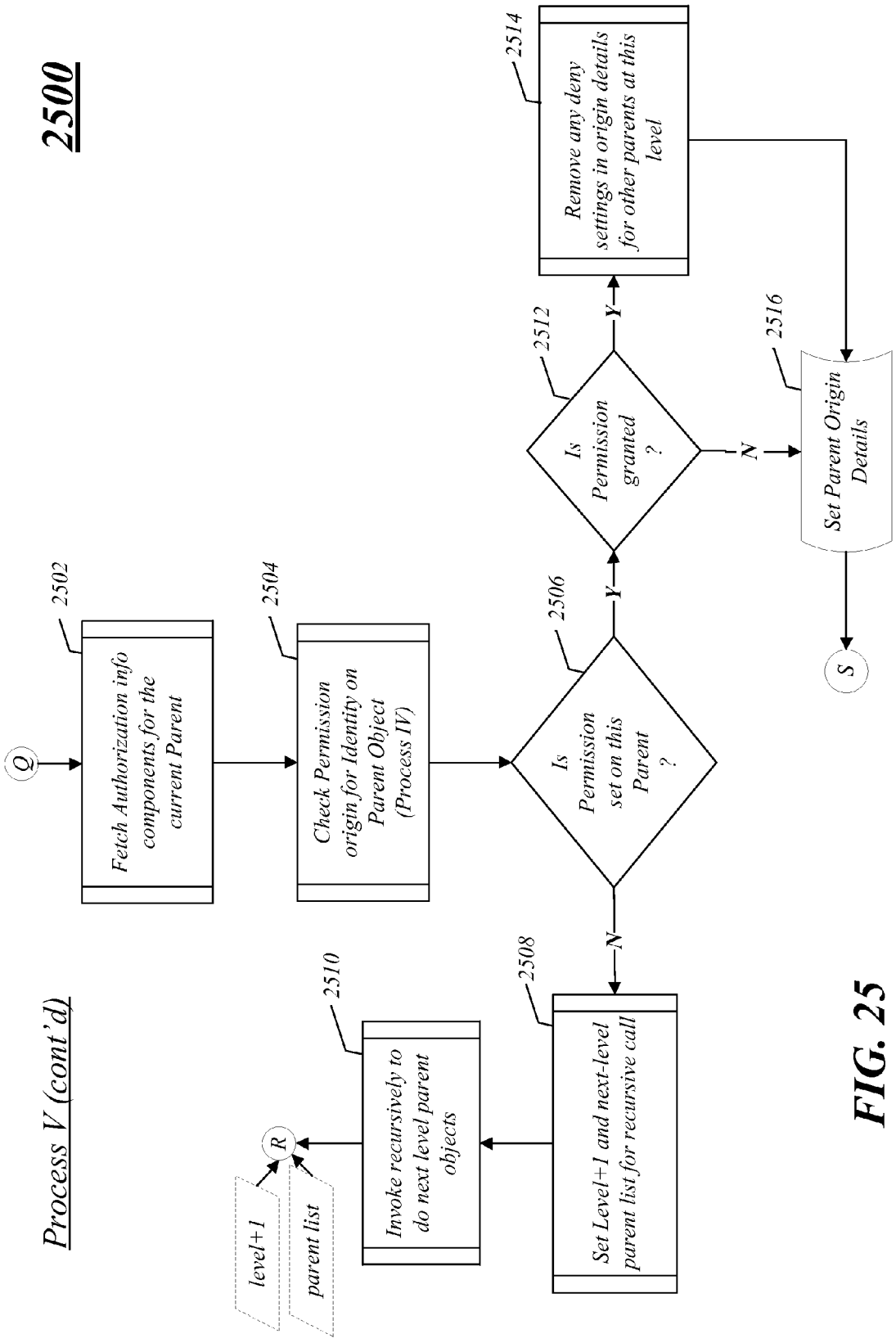
FIG. 25 illustrates an embodiment of a sixteenth logic flow for the apparatus of FIG. 1.

At 1270, if it has been determined that the selected permission for the selected identity does not originate from the requested resource object 402, flow may then pass to 1290. At 1290, it may be determined whether the selected permission for the selected identity is inherited from a related resource object 404 of the requested resource object 402, such as a parent of the requested resource object 402. For example, resource origin component 122-2 of FIG. 1 may determine whether a selected permission 204-1 for a selected identity 206-1 is inherited from a parent of resource object 142-*b*. The operations performed at 1290 may comprise a process V, an example embodiment of which is illustrated in FIGS. 23 to 25. Flow may then pass to 1292.

At 1292, if it has been determined that the selected permission 204-1 for the selected identity 206-1 is inherited from a parent of the requested resource object 402, flow may then pass to 1294. At 1294, information may be added to the response collection indicating that the selected permission 204-1 for the selected identity 206-1 is inherited from a parent of the requested resource object 402. Flow may then pass back to 1240.

Figure 26:
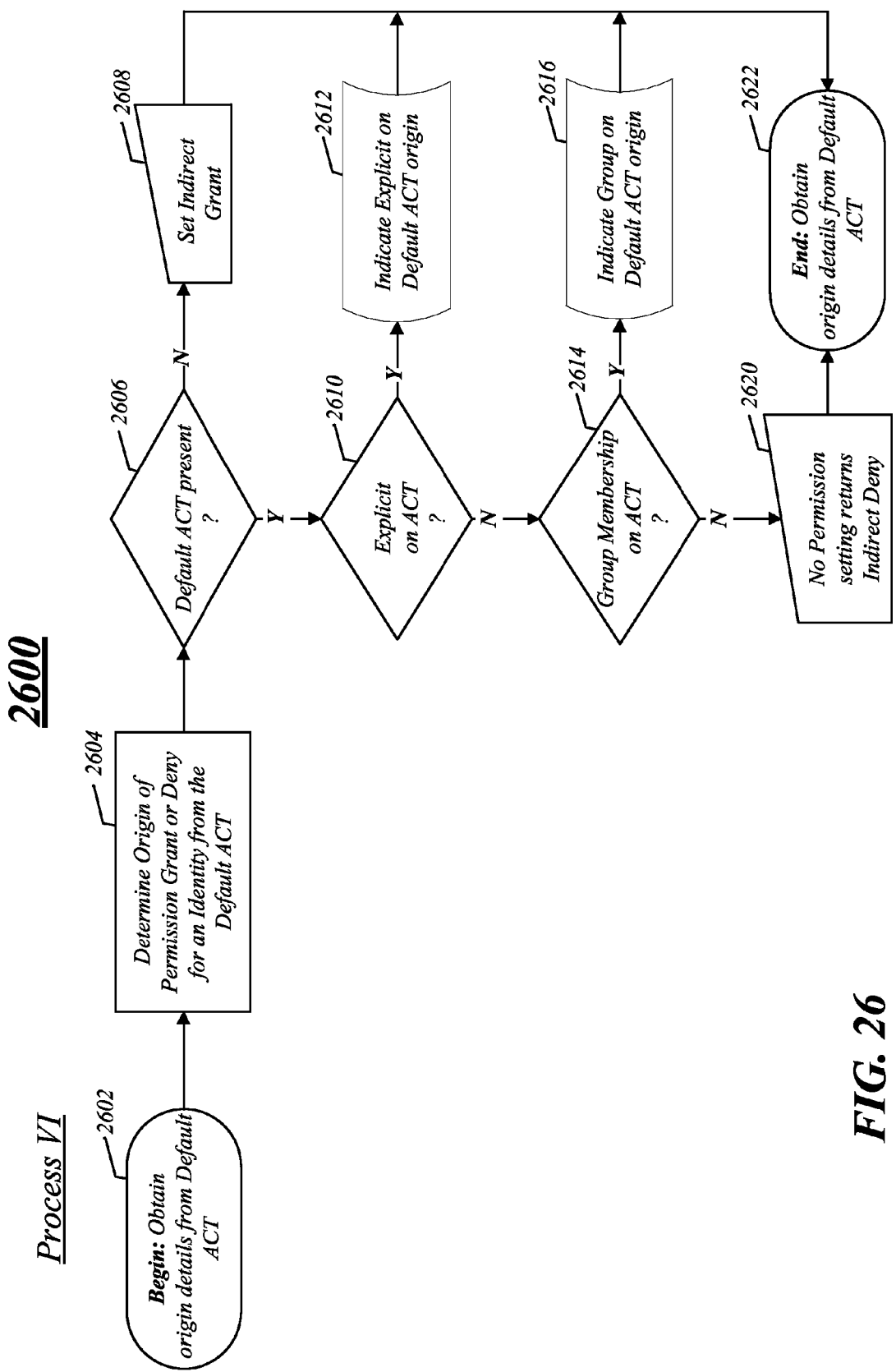
FIG. 26 illustrates an embodiment of a seventeenth logic flow for the apparatus of FIG. 1.

At 1292, if it has been determined that the selected permission 204-1 for the selected identity 206-1 is not inherited from a parent of the requested resource object 402, flow may then pass to 1296. At 1296, a permission setting for the selected identity 206-1 may be retrieved from a default access control template. For example, resource origin component 122-2 of FIG. 1 may retrieve a permission setting for the selected identity 206-1 from a default access control template. The permission setting may indicate whether the default access control template comprises a rule that sets the selected permission 204-1 on the requested resource object 402 for the selected identity 206-1, or for a group of which the selected identity 206-1 is a member, such as a user 506 of a group 508 as described with reference to FIG. 5. The operations performed at 1296 may comprise a process VI, an example embodiment of which is illustrated in FIG. 26. Flow may then pass to 1298.

At 1298, information may be added to the response collection indicating whether the selected permission 204-1 for the selected identity 206-1 originates from the default access control template to the requested resource object 402 for the selected identity 206-1 or from application of the default access control template to the requested resource object 402 for a group 508 of which the selected identity 206-1 is a member. For example, resource origin component 122-2 of FIG. 1 may add information to the response collection indicating whether the selected permission 204-1 for the selected identity 206-1 originates from application of the default access control template to a resource object 142-*b* for the selected identity 206-1, or from application of the default access control template to the resource object 142-*b* for a group 508 of which the selected identity 206-1 is a member. Flow may then pass back to 1240.

FIG. 13 illustrates one embodiment of a logic flow 1300. Logic flow 1300 may comprise a first portion of a process II. Process II may comprise a process for retrieving an inheritance parent information structure for a requested resource object 402, such as might be used at node 1120 in FIG. 11.

Logic flow 1300 comprises a node B. Node B is included for ease of understanding, and indicates a point at which logic flow 1300 may connect with logic flow 1400 of FIG. 14 within process II.

Logic flow 1300 may begin at 1302. At 1304, parents of the requested resource object may be determined. Flow may then pass to node B, and thus into logic flow 1400 of FIG. 14. Once the operations of logic flow 1400 are complete, flow may pass to 1306, which represents a state in which all parent information has been obtained. Flow may then pass to 1308. At 1308, the inheritance parent information structure for the requested resource object may be returned.

FIG. 14 illustrates one embodiment of a logic flow 1400. Logic flow 1400 may comprise a second portion of process II. Similarly to logic flow 1300 of FIG. 13, logic flow 1400 comprises a node B. Node B is included for ease of understanding, and indicates a point at which logic flow 1400 may connect with logic flow 1300 of FIG. 13 within process II. Logic flow 1400 also comprises nodes C, D, and E. Nodes C, D, and E are included for ease of understanding, and indicate points at which logic flow 1400 may connect with logic flow 1500 of FIG. 15 within process II.

Logic flow 1400 may begin at 1402. At 1404, inheritance rules for a specified resource object and nesting level may be obtained. As indicated at 1406, operations may be recursively performed for each inheritance rule corresponding to the specified resource object's type. At 1408, it may be determined whether all of the obtained inheritance rules have been processed. If it is determined that all of the obtained inheritance rules have been processed, flow may pass to 1410, which represents a state in which all inheritance parents have been obtained at the specified nesting level. If it is determined that all of the obtained inheritance rules have not been processed, flow may pass to 1412.

At 1412, parent resource objects that match the current inheritance rule may be obtained. As indicated at 1414, operations may be recursively performed for each parent resource object matching the current inheritance rule. These operations are described in logic flow 1500 of FIG. 15. From 1414, flow may pass to node C and thus to node C in logic flow 1500 of FIG. 15.

FIG. 15 illustrates one embodiment of a sixth logic flow 1500. Logic flow 1500 may comprise a third portion of process II. Similarly to logic flow 1400 of FIG. 14, logic flow 1500 comprises nodes C, D, and E. Nodes C, D, and E are included for ease of understanding, and indicate points at which logic flow 1500 may connect with logic flow 1400 of FIG. 14 within process II. Nodes C, D, and E of logic flow 1500 may connect with nodes C, D, and E of logic flow 1400, respectively.

Flow may pass from logic flow 1400 of FIG. 14 into logic flow 1500 at node C. At 1502, it may be determined whether all parents have been processed for the current inheritance rule. If it is determined that all parents have been processed for the current inheritance rule, flow may pass to node E, and thus back to node E in logic flow 1400 of FIG. 14. If it is determined that all parents have not been processed for the current inheritance rule, flow may pass to 1504. At 1504, an inheritance information item may be created for the current parent resource object, and a resource object reference to the current parent resource object may be inserted into a child resource object's parent reference array. Flow may then pass to 1506.

At 1506, the current level and current parent resource object may be set such as to enable determination of parent resource objects at the next nesting level above the current level. From 1506, flow may pass to node D, and thus to node D in logic flow 1400 of FIG. 14.

Figure 16:
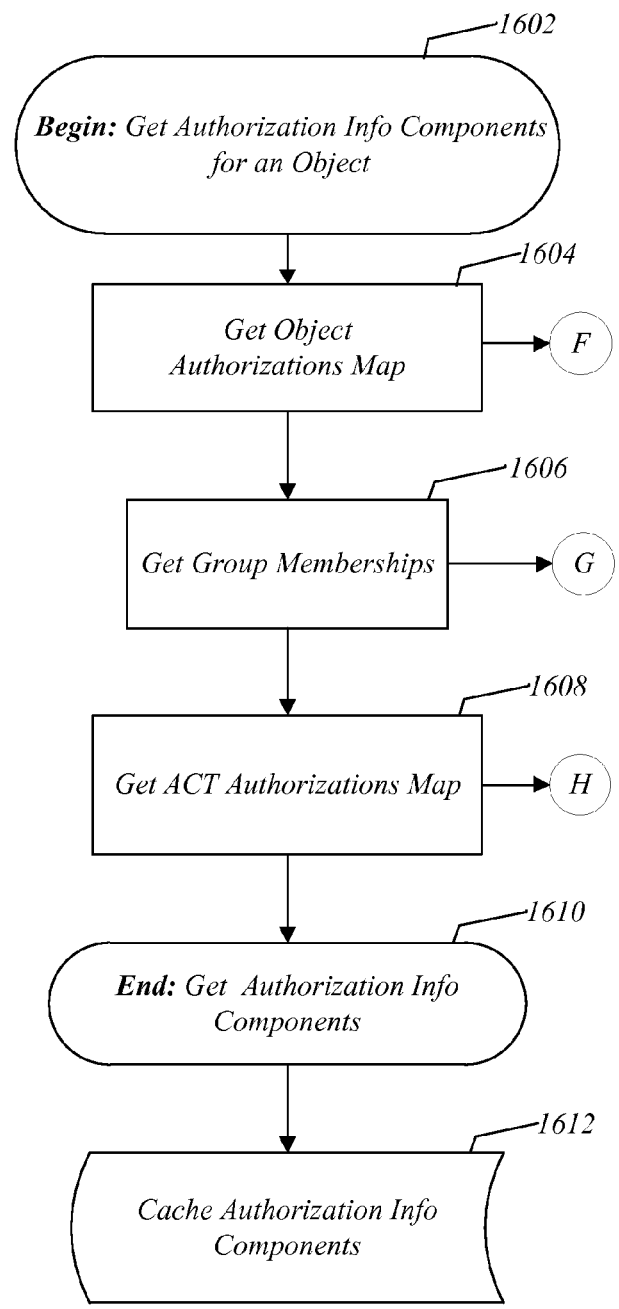
FIG. 16 illustrates an embodiment of a seventh logic flow for the apparatus of FIG. 1.

FIG. 16 illustrates one embodiment of a logic flow 1600. Logic flow 1600 may comprise a first portion of a process III. Process III may comprise a process for retrieving authorization information components for a resource object, such as might be used at node 1130 in FIG. 11.

Logic flow 1600 comprises nodes F, G, and H. Nodes F, G, and H are included for ease of understanding, and indicate points at which logic flow 1600 may connect with logic flow 1700 in FIG. 17, logic flow 1800 in FIG. 18, and logic flow 1900 in FIG. 19, respectively, within process III.

Logic flow 1600 may begin at 1602. At 1604, a resource object authorizations map may be obtained via operations performed in logic flow 1700 in FIG. 17. From 1604, flow may pass to node F, and thus to node F of logic flow 1700 in FIG. 17. Once the resource object authorizations map has been obtained, flow may return to 1604, and subsequently pass to 1606.

Figure 18:
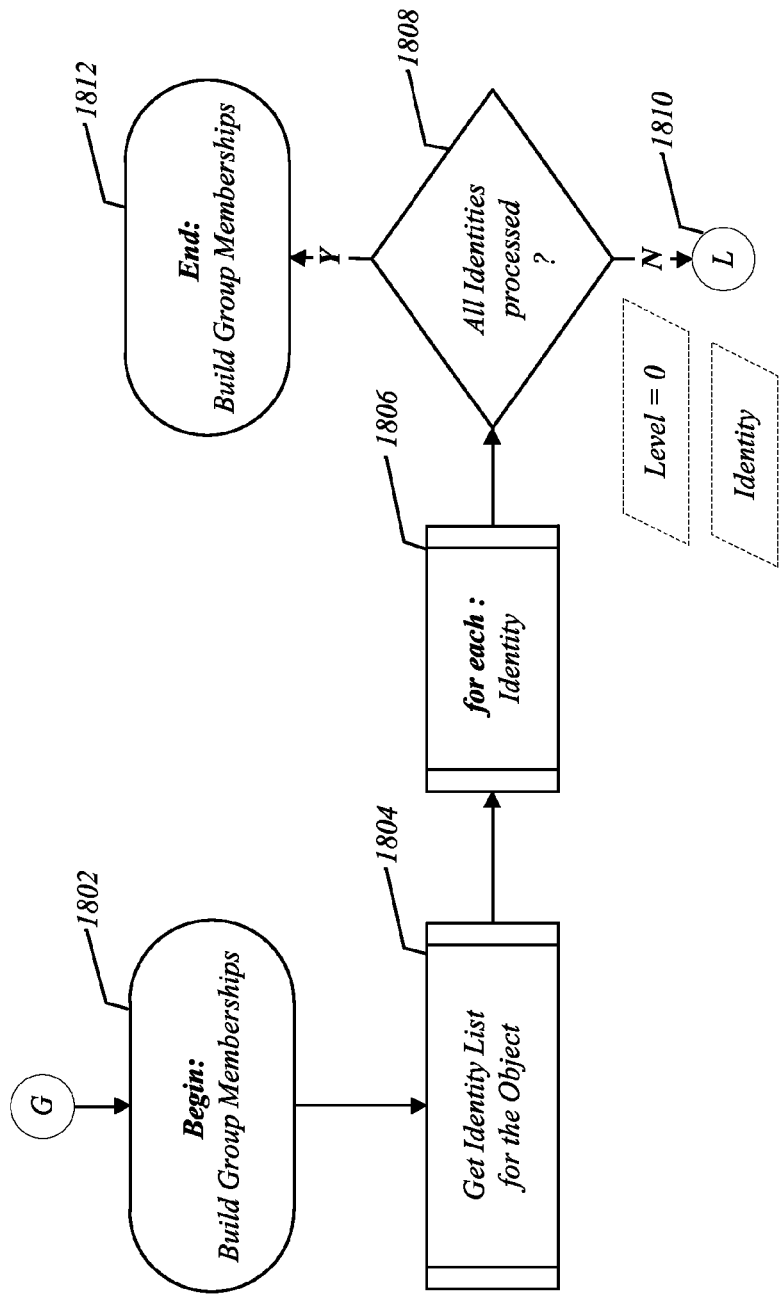
FIG. 18 illustrates an embodiment of a ninth logic flow for the apparatus of FIG. 1.

At 1606, group memberships may be determined via operations performed in logic flow 1800 in FIG. 18. From 1606, flow may pass to node G, and thus to node G of logic flow 1800 in FIG. 18. Once the group memberships have been determined, flow may return to 1606, and subsequently pass to 1608.

Figure 19:
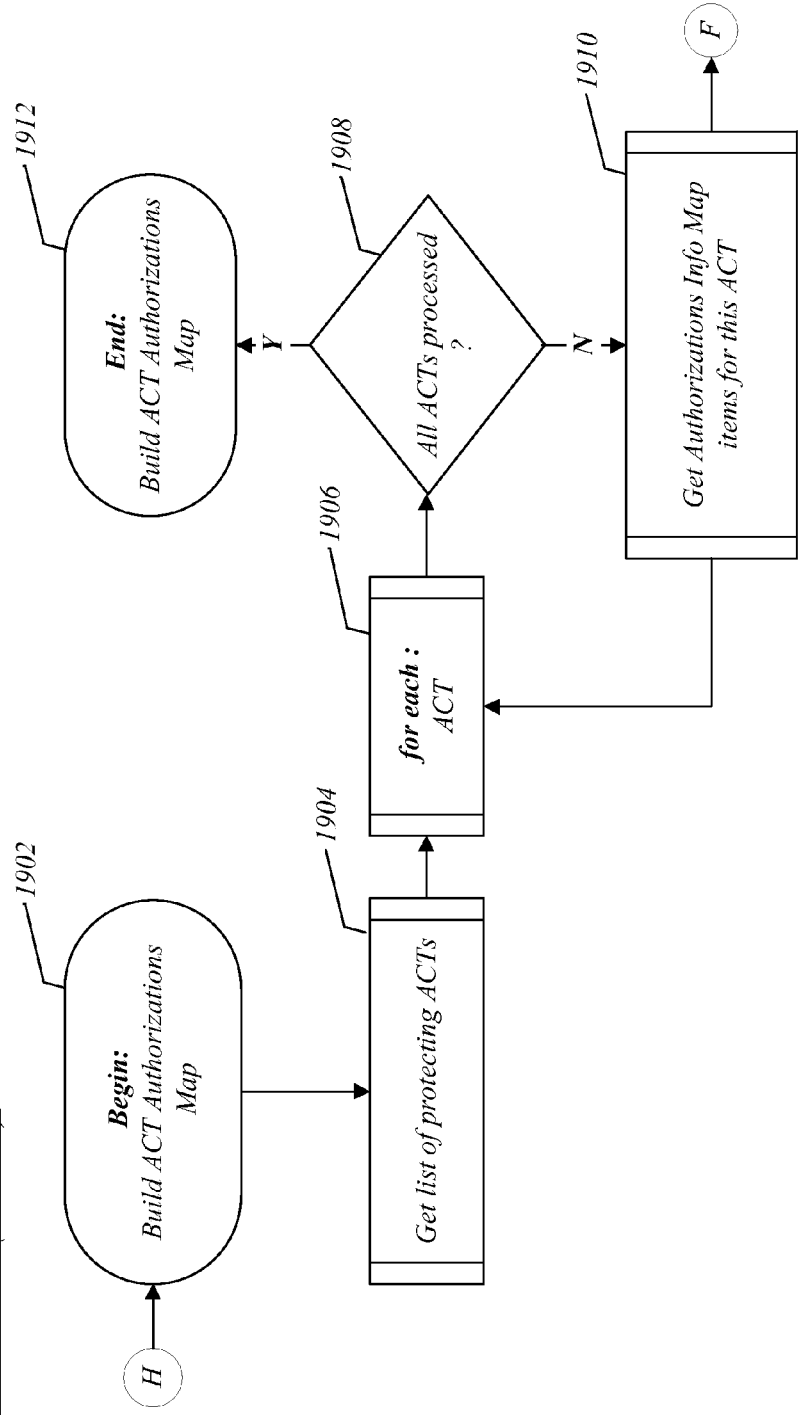
FIG. 19 illustrates an embodiment of a tenth logic flow for the apparatus of FIG. 1.

At 1608, an access control template authorizations map may be obtained via operations performed in logic flow 1900 in FIG. 19. From 1608, flow may pass to node H, and thus to node H of logic flow 1900 in FIG. 19. Once the access control template authorizations map has been obtained, flow may return to 1608, and subsequently pass to 1610. 1610 may depict a state in which all of the authorization information components for the selected resource object have been obtained. At 1612, the authorization information components may be cached.

Figure 17:
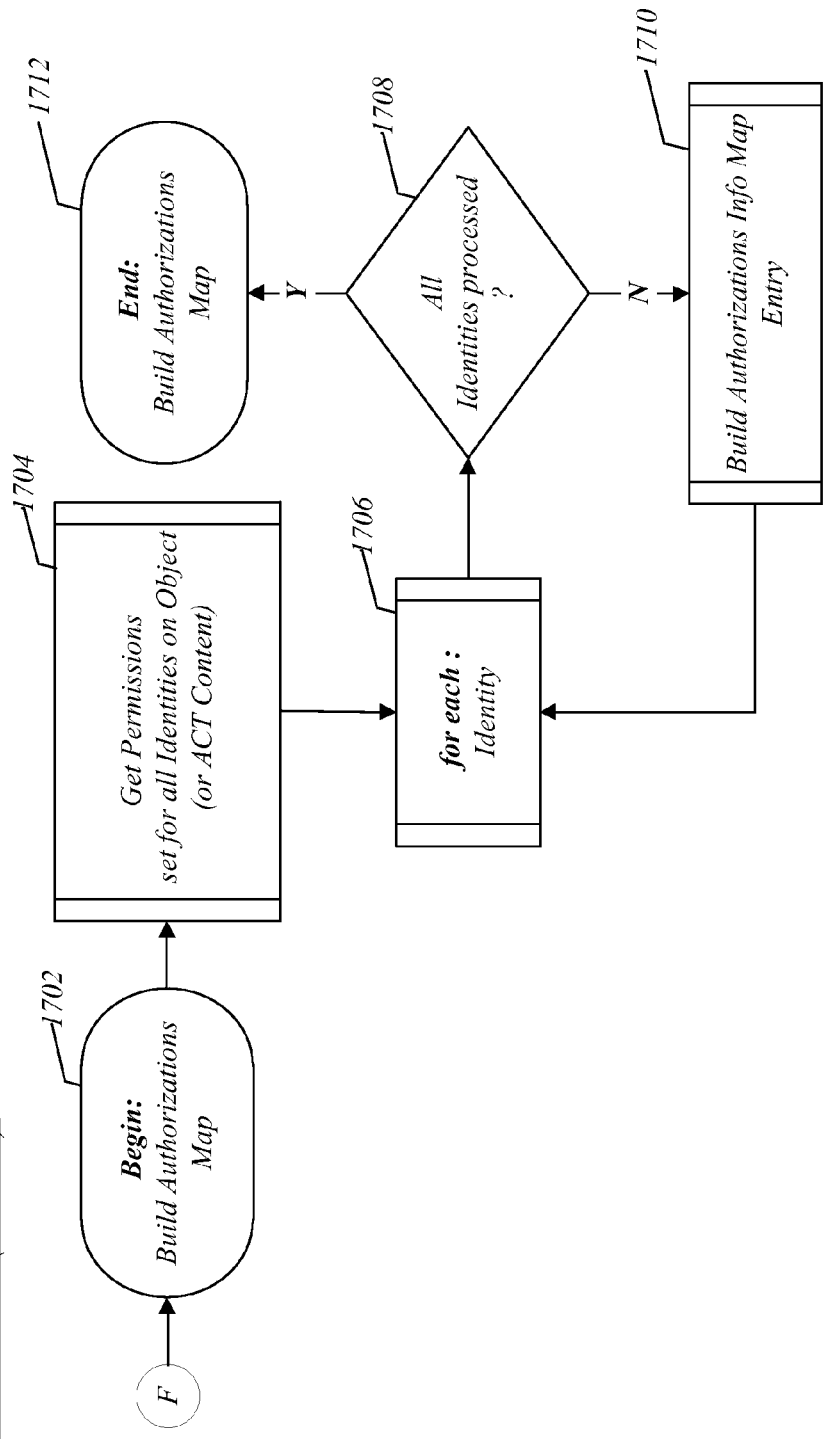
FIG. 17 illustrates an embodiment of an eighth logic flow for the apparatus of FIG. 1.

FIG. 17 illustrates one embodiment of a logic flow 1700. Logic flow 1700 may comprise a second portion of process III. Similarly to logic flow 1600 of FIG. 16, logic flow 1700 comprises a node F. Node F is included for ease of understanding, and indicates a point at which logic flow 1700 may connect with logic flow 1600 of FIG. 16 within process III. Flow within process III may pass from node F in logic flow 1600 to node F in logic flow 1700. Flow may then pass to 1702, where process 1700 may begin. At 1704, the permissions set for all identities 206-*e* on a resource object 142-*b* or access control template content may be retrieved. As shown at 1706, for each identity 206-*e* with permissions 204-*d* on the resource object 142-*b* or access control template content, an authorization information map entry may be built at 1710. On each iteration, it may be determined at 1708 whether all identities 206-*e* have been processed. If it is determined that all identities 206-*e* have not been processed, a next identity may be selected at 1710 and a corresponding entry may be added to the authorizations information map. If it is determined that all identities 206-*e* have been processed, flow may pass to 1712, where logic flow 1700 may end.

Figure 20:
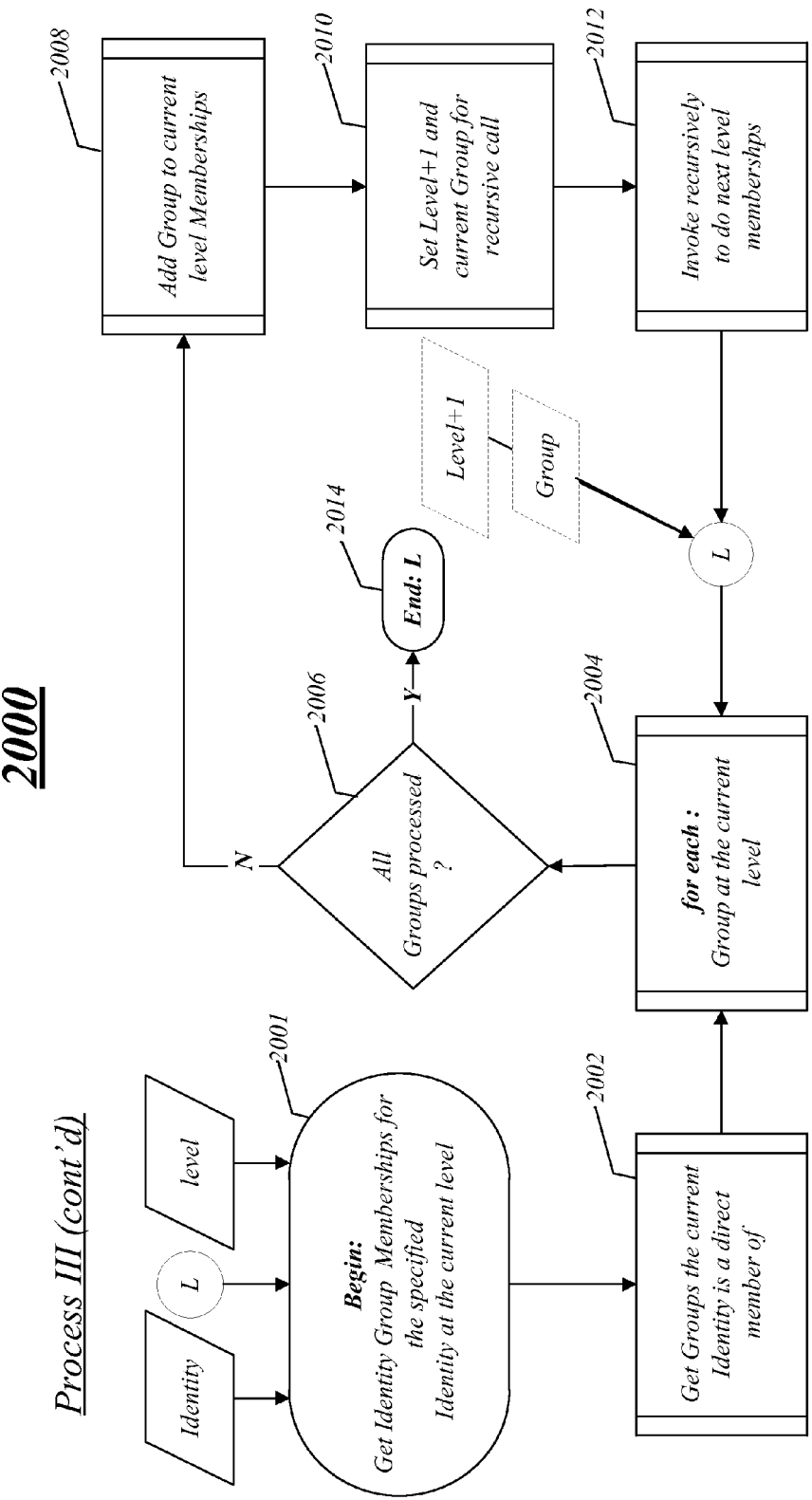
FIG. 20 illustrates an embodiment of an eleventh logic flow for the apparatus of FIG. 1.

FIG. 18 illustrates one embodiment of a logic flow 1800. Logic flow 1800 may comprise a third portion of process III. Similarly to logic flow 1600 of FIG. 16, logic flow 1800 comprises a node G. Node G is included for ease of understanding, and indicates a point at which logic flow 1800 may connect with logic flow 1600 of FIG. 16 within process III. Flow within process III may pass from node G in logic flow 1600 to node G in logic flow 1800. Flow may then pass to 1802, where process 1800 may begin. At 1804, an identity list for the resource object may be retrieved. As shown at 1806, for each identity in the identity list, flow may pass through node L, which connects with logic flow 2000 of FIG. 20. Logic flow 2000 of FIG. 20 is operative to generate the nested collection of groups associated with a particular identity, and is discussed in detail below. On each iteration in logic flow 1800, it may be determined at 1808 whether all identities have been processed. If it is determined that all identities have not been processed, a next identity may be selected and flow passed to logic flow 2000 of FIG. 20, as illustrated at 1810. If it is determined that all identities have been processed, flow may pass to 1812, where logic flow 1800 may end.

FIG. 19 illustrates one embodiment of a logic flow 1900. Logic flow 1900 may comprise a fourth portion of process III. Similarly to logic flow 1600 of FIG. 16, logic flow 1900 comprises a node H. Node H is included for ease of understanding, and indicates a point at which logic flow 1900 may connect with logic flow 1600 of FIG. 16 within process III. Flow within process III may pass from node H in logic flow 1600 of FIG. 16 to node H in logic flow 1900. Flow may then pass to 1902, where logic flow 1900 may begin. At 1904, a list of access control templates that are set to protect the resource object may be retrieved. As shown at 1906, for each access control template in the list, authorization information map items may be retrieved at 1910. On each iteration, it may be determined at 1908 whether all access control templates have been processed. If it is determined that all access control templates have not been processed, a next access control template may be selected at 1910 and authorization information map items corresponding to the selected access control template may be retrieved. If it is determined that all access control templates have been processed, flow may pass to 1912, where logic flow 1900 may end.

FIG. 20 illustrates one embodiment of an logic flow 2000. Logic flow 2000 may comprise a fifth portion of process III. Similarly to logic flow 1800 of FIG. 18, logic flow 2000 comprises a node L. Node L is included for ease of understanding, and indicates a point at which logic flow 2000 may connect with logic flow 1800 of FIG. 18 within process III. Flow within process III may pass from node L in logic flow 1800 to node L in logic flow 2000. Logic flow 2000 may accept a current identity and a current nesting level as inputs from logic flow 1800 of FIG. 18. Flow may then pass to 2001, where logic flow 2000 may begin. At 2002, the groups of which the current identity is a direct member may be determined. As shown at 2004, for each group at the current nesting level, several operations may be performed. On each iteration, it may be determined at 2006 whether all groups have been processed. If it is determined that all groups have not been processed, a next group may be selected, and added to a list of identity group memberships for the current nesting level at 2008. At 2010, the current nesting level may be incremented and the current identity may be set to the selected group. As shown at 2012, a recursive process may be used to find group memberships at a nesting level one step above the level of the selected group, by returning to 2001 and accepting the incremented nesting level and the selected group as the current level and current identity inputs, respectively. If it is determined at 2006 that all groups have been processed, flow may pass to 2014, where logic flow 2000 may end FIG. 21 illustrates one embodiment of a logic flow 2100. Logic flow 2100 may comprise a first portion of a process IV. Process IV may comprise a process for determining whether a selected permission 204-*d* for a selected identity 206-*e* originates from a requested resource object 402, such as might be used at node 1260 in FIG. 12.

Logic flow 2100 comprises a node M. Node M is included for ease of understanding, and indicates a point at which logic flow 2100 may connect with logic flow 2200 of FIG. 22 within process IV.

Logic flow 2100 may begin at 2102. At 2104, a permission 204-*d* for a particular identity 206-*e* on a particular resource object 142-*b* may be selected. As indicated at 2106, logic flow 2100 may make use of resource object authorization components. These resource object authorization components may comprise an authorizations map, a group membership nesting structure, and an access control template authorizations map, such as may be generated according to process III. From 2104, flow may pass to node M, and thus into logic flow 2200 of FIG. 22.

FIG. 22 illustrates one embodiment of a logic flow 2200. Logic flow 2200 may comprise a second portion of process IV. Similarly to logic flow 2100 of FIG. 21, logic flow 2200 comprises a node M. Node M is included for ease of understanding, and indicates a point at which logic flow 2200 may connect with logic flow 2100 of FIG. 21 within process IV. From node M, flow may pass to 2202, where it may be determined whether the selected permission 204-*d* is explicitly set on the particular resource object 142-*b* for the particular identity 206-*e*. If it is determined that the selected permission 204-*d* is explicitly set on the particular resource object 142-*b* for the particular identity 206-*e*, flow may pass to 2204, where an indication may be returned that the permission 204-*d* is explicitly set on the particular resource object 142-*b* for the particular identity 206-*e*. Flow may then pass to 2220, where logic flow 2200 may end. At 2202, if it is determined that the selected permission 204-*d* is not explicitly set on the particular resource object 142-*b* for the particular identity 206-*e*, flow may pass to 2206.

At 2206, it may be determined whether the selected permission 204-*d* is set on the particular resource object 142-*b* for the particular identity 206-*e* by an access control template applied to the particular resource object 142-*b*. If it is determined that the selected permission 204-*d* is set on the particular resource object 142-*b* for the particular identity 206-*e* by an access control template explicitly applied to the particular resource object 142-*b*, flow may pass to 2208, where an indication may be returned that the selected permission 204-*d* is set on the particular resource object 142-*b* for the particular identity 206-*e* by an access control template explicitly applied to the particular resource object 142-*b*. Flow may then pass to 2220, where logic flow 2200 may end. At 2206, if it is determined that the selected permission 204-*d* is not set on the particular resource object 142-*b* for the particular identity 206-*e* by an access control template explicitly applied to the particular resource object 142-*b*, flow may pass to 2210.

At 2210, it may be determined whether the selected permission 204-*d* is explicitly set on the particular resource object 142-*b* for a group of which particular identity 206-*e* is a member. If it is determined that the selected permission 204-*d* is explicitly set on the particular resource object 142-*b* for a group of which particular identity 206-*e* is a member, flow may pass to 2212, where an indication may be returned that the selected permission 204-*d* is explicitly set on the particular resource object 142-*b* for a group of which particular identity 206-*e* is a member. Flow may then pass to 2220, where logic flow 2200 may end. At 2210, if it is determined that the selected permission 204-*d* is not explicitly set on the particular resource object 142-*b* for a group of which particular identity 206-*e* is a member, flow may pass to 2214.

At 2214, it may be determined whether the selected permission 204-*d* is set on the particular resource object 142-*b* for a group of which the particular identity 206-*e* is a member by an access control template applied to the particular resource object 142-*b*. If it is determined that the selected permission 204-*d* is set on the particular resource object 142-*b* for a group of which particular identity 206-*e* is a member by an access control template applied to the particular resource object 142-*b*, flow may pass to 2216, where an indication may be returned that the selected permission 204-*d* is set on the particular resource object 142-*b* for a group of which particular identity 206-*e* is a member by an access control template applied to the particular resource object 142-*b*. Flow may then pass to 2220, where logic flow 2200 may end. At 2214, if it is determined that the selected permission 204-*d* is not set on the particular resource object 142-*b* for a group of which particular identity 206-*e* is a member by an access control template applied to the particular resource object 142-*b*, flow may pass to 2218. At 2218, an indication may be returned that the selected permission 204-*d* does not originate from the particular resource object 142-*b*. Flow may then pass to 2220, where logic flow 2200 may end.

FIG. 23 illustrates one embodiment of a fourteenth logic flow 2300. Logic flow 2300 may comprise a first portion of a process V. Process V may comprise a process for determining whether a selected permission 204-*d* for a particular identity 206-*e* on a particular resource object 142-*b* is inherited from a parent of the particular resource object 142-*b*, such as might be used at node 1290 in FIG. 12.

Logic flow 2300 comprises a node P. Node P is included for ease of understanding, and indicates a point at which logic flow 2300 may connect with logic flow 2400 of FIG. 24 within process V.

Logic flow 2300 may begin at 2302. At 2304, the parents of the particular resource object may be identified. Flow may then pass to node P at 2306, which connects with logic flow 2400 of FIG. 24. Logic flow 2400 of FIG. 24 is operative in combination with logic flow 2500 of FIG. 25 to determine whether a selected permission 204-*d* for a particular identity 206-*e* on a particular resource object 142-*b* is inherited from one or more parents of the particular resource object 142-*b*, and is discussed in detail below. Flow may return to logic flow 2300 at node P via block 2410 of logic flow 2400 in FIG. 24. Based on the operations performed in logic flow 2400 of FIG. 24 and logic flow 25 of FIG. 25, it is determined at 2308 whether the selected permission 204-*d* for the particular identity 206-*e* on the particular resource object 142-*b* is inherited from a parent of the particular resource object 142-*b*.

If it is determined that the selected permission 204-*d* for the particular identity 206-*e* on the particular resource object 142-*b* is inherited from a parent of the particular resource object 142-*b*, flow may pass to 2312. At 2312, inherited origin details may be returned that indicate the parent resource object(s) from which the selected permission 204-*d* is inherited by the particular resource object 142-*b*. Flow may then pass to 2314, where logic flow 2300 may end.

If it is determined that the selected permission 204-*d* for the particular identity 206-*e* on the particular resource object 142-*b* is not inherited from a parent of the particular resource object 142-*b*, flow may pass to 2310. At 2310, an indication may be returned that the selected permission 204-*d* for the particular identity 206-*e* on the particular resource object 142-*b* is not inherited from a parent of the particular resource object 142-*b*. Flow may then pass to 2314, where logic flow 2300 may end.

FIG. 24 illustrates one embodiment of a logic flow 2400. Logic flow 2400 may comprise a second portion of process V. Similarly to logic flow 2300 of FIG. 23, logic flow 2400 comprises a node P. Node P is included for ease of understanding, and indicates a point at which logic flow 2400 may connect with logic flow 2300 of FIG. 23 within process V. Logic flow 2400 also comprises nodes Q, R, and S. Nodes Q, R, and S are included for ease of understanding, and indicate points at which logic flow 2400 may connect with logic flow 2500 of FIG. 25 within process V.

Flow within process V may pass from node P in logic flow 2300 of FIG. 23 to node P in logic flow 2400. Logic flow 2400 may accept a current parent list and a current nesting level as inputs from logic flow 2300 of FIG. 23. Flow may then pass to 2401, where logic flow 2400 may begin. At 2402, it may be determined whether the current parent list is empty. If it is determined that the current parent list is empty, flow may pass to 2404, where an indication may be returned that the selected permission does not originate from an inheritance path associated with the current parent list. If it is determined that the current parent list is not empty, flow may pass to 2406, where an iterative process may begin. As indicated at 2406, each parent in the parent list corresponding to the current nesting level may be processed to determine whether the selected permission 204-*d* originates from that parent. On each iteration, at 2408, it is determined whether all parents at the current nesting level have been processed. If it is determined that all parents at the current nesting level have been processed, flow may pass to 2410, where logic flow 2400 may end. If it is determined that all parents at the current nesting level have not been processed, flow may pass to node Q, and thus into logic flow 2500 of FIG. 25.

FIG. 25 illustrates one embodiment of a logic flow 2500. Logic flow 2500 may comprise a third portion of process V. Similarly to logic flow 2400 of FIG. 24, logic flow 2500 comprises nodes Q, R, and S. Nodes Q, R, and S are included for ease of understanding, and indicate points at which logic flow 2500 may connect with logic flow 2400 of FIG. 24 within process V. Nodes Q, R, and S of logic flow 2500 may connect with nodes Q, R, and S of logic flow 2400, respectively.

Flow may pass into logic flow 2500 at node Q, from node Q in logic flow 2400 of FIG. 24, on each iteration of the process at 2406 in FIG. 24. At 2502, authorization information components for the current parent associated with that iteration may be retrieved. Retrieving the authorization information components for the current parent may involve generating those authorization information components using process III of FIGS. 16 to 20, or may involve retrieving those authorization information components from a cache. Flow may then pass to 2504. At 2504, process IV of FIGS. 21 to 22 may be invoked to determine whether the selected permission 204-*d* for the particular identity 206-*e* on the particular resource object 142-*b* originates from the current parent. Flow may then pass to 2506.

At 2506, if it has been determined that the selected permission 204-*d* for the particular identity 206-*e* on the particular resource object 142-*b* originates from the current parent, flow may pass to 2512. At 2512, it may be determined whether the selected permission 204-*d* is a "Grant" permission. If it is determined that the selected permission 204-*d* is a "Grant" permission, flow may pass to 2514, where any deny settings for other parents at the current nesting level may be removed from the authorization origin details for the other parents at the current nesting level. Flow may then pass to 2516, where the parent origin details may be set to indicate that the selected permission 204-*d* for the particular identity 206-*e* on the particular resource object 142-*b* is set on the current parent. If it is determined at 2512 that the selected permission 204-*d* is not a "Grant" permission, flow may pass directly to 2516. From 2516, flow may pass to node S, and thus back to node S in logic flow 2400 of FIG. 24.

At 2506, if it has been determined that the selected permission 204-*d* for the particular identity 206-*e* on the particular resource object 142-*b* does not originate from the current parent, flow may pass to 2508. At 2508, the current nesting level may be incremented, and the current parent list may be populated with parents residing at the incremented current nesting level. As illustrated at 2510, this enables the recursive process of block 2406 in logic flow 2400 of FIG. 24. From 2510, flow may pass to node R, and thus back to node R in logic flow 2400 of FIG. 24.

FIG. 26 illustrates one embodiment of a logic flow 2600. Logic flow 2600 may comprise a process VI. Process VI may comprise a process for obtaining a permission setting from a default access control template, such as might be used at node 1296 of process 1200 in FIG. 12.

Logic flow 2600 may begin at 2602. At 2604, a permission 204-*d* for a particular identity 206-*e* on a particular resource object 142-*b* may be selected. Flow may then pass to 2606. At 2606, it may be determined whether a default access control template exists. If it is determined that a default access control template does not exist, flow may pass to 2608, where an indication may be returned that the selected permission 204-*d* for the particular identity 206-*e* on the particular resource object 142-*b* is an indirect grant. Flow may then pass to 2622, where logic flow 2600 may end. At 2606, if it is determined that a default access control template exists, flow may pass to 2610.

At 2610, it may be determined whether the selected permission 204-*d* is explicitly set on the particular resource object 142-*b* for the particular identity 206-*e* by the default access control template. If it is determined that the selected permission 204-*d* is explicitly set on the particular resource object 142-*b* for the particular identity 206-*e* by the default access control template, flow may pass to 2612, where an indication may be returned that the selected permission 204-*d* is explicitly set on the particular resource object 142-*b* for the particular identity 206-*e* by the default access control template. Flow may then pass to 2622, where logic flow 2600 may end. At 2610, if it is determined that the selected permission 204-*d* is not explicitly set on the particular resource object 142-*b* for the particular identity 206-*e* by the default access control template, flow may pass to 2614.

At 2614, it may be determined whether the selected permission 204-*d* is set on the particular resource object 142-*b* for a group of which the particular identity 206-*e* is a member by the default access control template. If it is determined that the selected permission 204-*d* is set on the particular resource object 142-*b* for a group of which the particular identity 206-*e* is a member by the default access control template, flow may pass to 2616, where an indication may be returned that the selected permission 204-*d* is set on the particular resource object 142-*b* for a group of which the particular identity 206-*e* is a member by the default access control template. Flow may then pass to 2622, where logic flow 2600 may end. At 2614, if it is determined that the selected permission 204-*d* is not set on the particular resource object 142-*b* for a group of which the particular identity 206-*e* is a member by the default access control template, flow may pass to 2620. At 2620, an indication may be returned that the selected permission 204-*d* for the particular identity 206-*e* on the particular resource object 142-*b* is an indirect deny. Flow may then pass to 2622, where logic flow 2600 may end.

Figure 27:
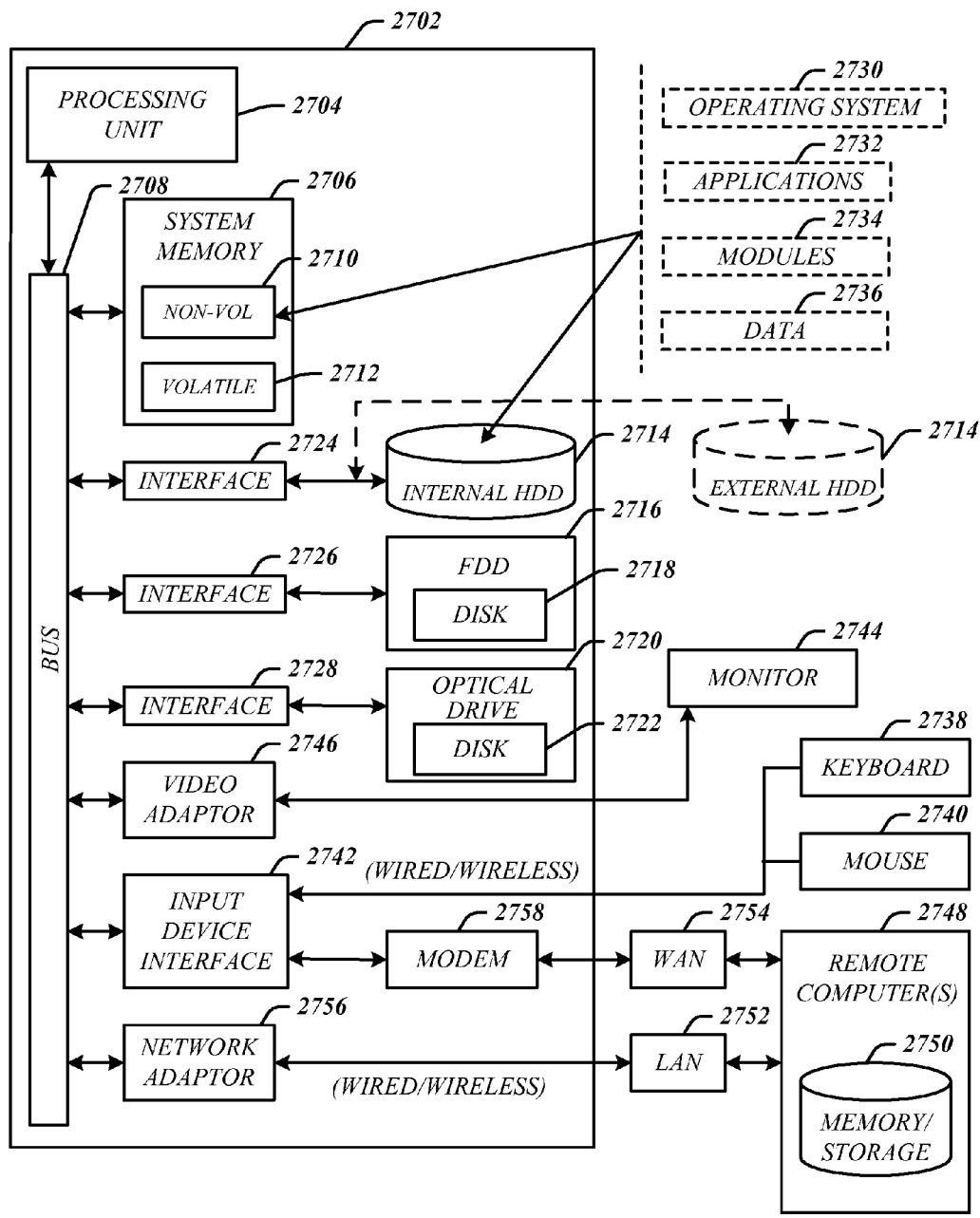
FIG. 27 illustrates an embodiment of a computing architecture.

FIG. 27 illustrates an embodiment of an exemplary computing architecture 2700 suitable for implementing various embodiments as previously described. In one embodiment, the computing architecture 2700 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 2700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 2700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 2700.

As shown in FIG. 27, the computing architecture 2700 comprises a processing unit 2704, a system memory 2706 and a system bus 2708. The processing unit 2704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 2704.

The system bus 2708 provides an interface for system components including, but not limited to, the system memory 2706 to the processing unit 2704. The system bus 2708 can be any of several types of bus structure that may further interconnect to a memory bus (with or without a memory controller), a peripheral bus, and a local bus using any of a variety of commercially available bus architectures. Interface adapters may connect to the system bus 2708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 2700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 2706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 27, the system memory 2706 can include non-volatile memory 2710 and/or volatile memory 2712. A basic input/output system (BIOS) can be stored in the non-volatile memory 2710.

The computer 2702 may include various types of computer-readable storage media in the form of one or more lower speed memory units, including an internal (or external) hard disk drive (HDD) 2714, a magnetic floppy disk drive (FDD) 2716 to read from or write to a removable magnetic disk 2718, and an optical disk drive 2720 to read from or write to a removable optical disk 2722 (e.g., a CD-ROM or DVD). The HDD 2714, FDD 2716 and optical disk drive 2720 can be connected to the system bus 2708 by a HDD interface 2724, an FDD interface 2726 and an optical drive interface 2728, respectively. The HDD interface 2724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 2710, 2712, including an operating system 2730, one or more application programs 2732, other program modules 2734, and program data 2736. In one embodiment, the one or more application programs 2732, other program modules 2734, and program data 2736 can include, for example, the various applications and/or components of the apparatus 100.

A user can enter commands and information into the computer 2702 through one or more wire/wireless input devices, for example, a keyboard 2738 and a pointing device, such as a mouse 2740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 2704 through an input device interface 2742 that is coupled to the system bus 2708, but can be connected by other interfaces such as a parallel port, IEEE 1394 serial port, a game port, a USB port, an IR interface, and so forth.

A monitor 2744 or other type of display device is also connected to the system bus 2708 via an interface, such as a video adaptor 2746. The monitor 2744 may be internal or external to the computer 2702. In addition to the monitor 2744, a computer typically includes other peripheral output devices, such as speakers, printers, and so forth.

The computer 2702 may operate in a networked environment using logical connections via wire and/or wireless communications to one or more remote computers, such as a remote computer 2748. The remote computer 2748 can be a workstation, a server computer, a router, a personal computer, portable computer, microprocessor-based entertainment appliance, a peer device or other common network node, and typically includes many or all of the elements described relative to the computer 2702, although, for purposes of brevity, only a memory/storage device 2750 is illustrated. The logical connections depicted include wire/wireless connectivity to a local area network (LAN) 2752 and/or larger networks, for example, a wide area network (WAN) 2754. Such LAN and WAN networking environments are commonplace in offices and companies, and facilitate enterprise-wide computer networks, such as intranets, all of which may connect to a global communications network, for example, the Internet.

When used in a LAN networking environment, the computer 2702 is connected to the LAN 2752 through a wire and/or wireless communication network interface or adaptor 2756. The adaptor 2756 can facilitate wire and/or wireless communications to the LAN 2752, which may also include a wireless access point disposed thereon for communicating with the wireless functionality of the adaptor 2756.

When used in a WAN networking environment, the computer 2702 can include a modem 2758, or is connected to a communications server on the WAN 2754, or has other means for establishing communications over the WAN 2754, such as by way of the Internet. The modem 2758, which can be internal or external and a wire and/or wireless device, connects to the system bus 2708 via the input device interface 2742. In a networked environment, program modules depicted relative to the computer 2702, or portions thereof, can be stored in the remote memory/storage device 2750. It will be appreciated that the network connections shown are exemplary and other means of establishing a communications link between the computers can be used.

The computer 2702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 28:
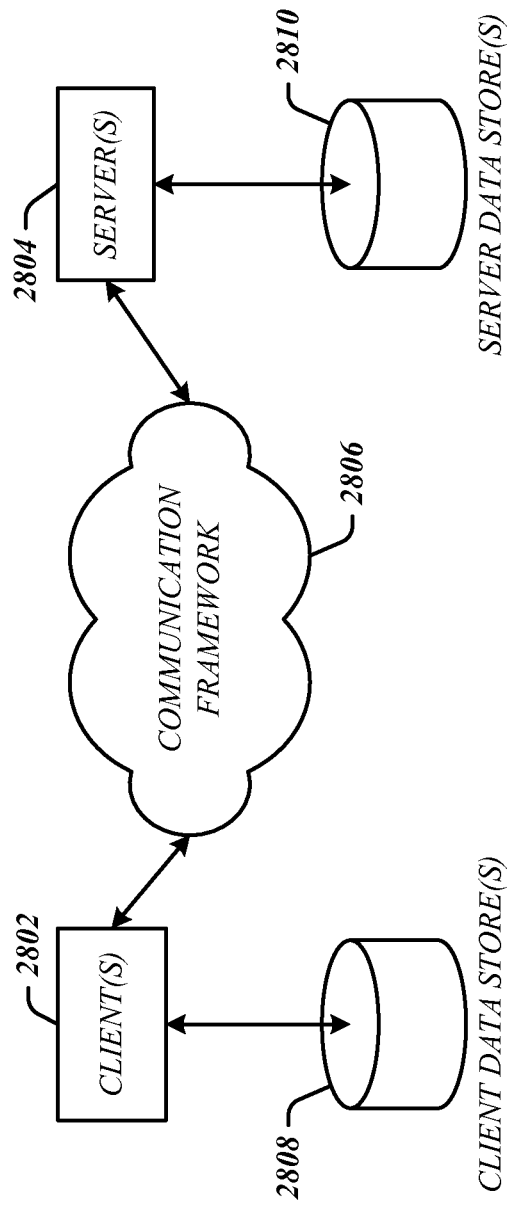
FIG. 28 illustrates an embodiment of a communications architecture.

FIG. 28 illustrates a block diagram of an exemplary communications architecture 2800 suitable for implementing various embodiments as previously described. The communications architecture 2800 includes various common communications elements, such as a transmitter, receiver, transceiver, radio, network interface, baseband processor, antenna, amplifiers, filters, power supplies, and so forth. The embodiments, however, are not limited to implementation by the communications architecture 2800.

As shown in FIG. 28, the communications architecture 2800 comprises includes one or more clients 2802 and servers 2804. The clients 2802 may implement the client device 910. The servers 2804 may implement the server device 950. The clients 2802 and the servers 2804 are operatively connected to one or more respective client data stores 2808 and server data stores 2810 that can be employed to store information local to the respective clients 2802 and servers 2804, such as cookies and/or associated contextual information.

The clients 2802 and the servers 2804 may communicate information between each other using a communication framework 2806. The communications framework 2806 may implement any well-known communications techniques and protocols. The communications framework 2806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 2806 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 2802 and the servers 2804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
   receiving, by a processor circuit, a request for an authorization origin of a resource object, the authorization origin comprising an access control with a permission arranged to control access to the resource object based on an identity;
   identifying the authorization origin of the resource object from a set of interrelated resource objects and associated access controls, the authorization origin comprising a direct authorization from the resource object or an indirect authorization from a related resource object from the set of interrelated resource objects;
   retrieving authorization origin information for the authorization origin including a basis for authorization for access to the resource object; and
   presenting the authorization origin information including the basis for authorization for access to the resource object in a user interface view, the authorization origin information to form part of an authorization map in the user interface view, the authorization map comprising authorization origin information for multiple resource objects.

2. The computer-implemented method of claim 1, comprising requesting access to the access controls for the requested resource object and interrelated resource objects.

3. The computer-implemented method of claim 1, comprising retrieving an access control for the requested resource object.

4. The computer-implemented method of claim 1, comprising determining that an access control for the requested resource object is the authorization origin.

5. The computer-implemented method of claim 1, comprising identifying one or more resource objects related to the resource object from the set of interrelated resource objects.

6. The computer-implemented method of claim 1, comprising identifying one or more resource objects related to the resource object from the set of interrelated resource objects, the set of interrelated resource objects comprising a resource object hierarchy.

7. The computer-implemented method of claim 1, comprising retrieving an access control for one of the related resource objects.

8. The computer-implemented method of claim 1, comprising determining an access control for a related resource object is the authorization origin.

9. The computer-implemented method of claim 1, comprising determining an access control for a default access control is the authorization origin.

10. At least one non-transitory computer-readable storage medium comprising instructions that, when executed, cause a system to:
    receive a request for an authorization origin of a resource object, the authorization origin comprising an access control with a permission arranged to control access to the resource object based on an identity;
    identify the authorization origin of the resource object from a set of interrelated resource objects and associated access controls, the authorization origin comprising a direct authorization from the resource object or an indirect authorization from a related resource object from the set of interrelated resource objects;
    retrieve authorization origin information for the authorization origin including a basis for authorization for access to the resource object; and
    present the authorization origin information including the basis for authorization for access to the resource object in a user interface view, the authorization origin information to form part of an authorization map in the user interface view, the authorization map comprising authorization origin information for multiple resource objects.

11. The non-transitory computer-readable storage medium of claim 10, comprising instructions that when executed cause the system to:
    retrieve an access control for the requested resource object; and
    determine an access control for the requested resource object is the authorization origin.

12. The non-transitory computer-readable storage medium of claim 10, comprising instructions that when executed cause the system to:
    identify one or more resource objects related to the resource object from the set of interrelated resource objects;
    retrieve an access control for one of the related resource objects; and
    determine an access control for a related resource object is the authorization origin.

13. The non-transitory computer-readable storage medium of claim 10, comprising instructions that when executed cause the system to:
    retrieve a default access control; and
    determine the default access control is the authorization origin.

14. An apparatus, comprising:
a processor circuit; and
a request processor component operative on the processor circuit to receive and process a request for an authorization origin of a resource object, the authorization origin comprising an access control with a permission arranged to control access to the resource object based on an identity; and
a resource origin component operative on the processor circuit to identify the authorization origin of the resource object from a set of interrelated resource objects and associated access controls, retrieve authorization origin information for the authorization origin including a basis for authorization for access to the resource object, and present the authorization origin information including the basis for authorization for access to the resource object in a user interface view, and
wherein the authorization origin comprises a direct authorization from the resource object or an indirect authorization from a related resource object from the set of interrelated resource objects,
wherein the authorization origin information to form part of an authorization map in the user interface view, and
wherein the authorization map comprises authorization origin information for multiple resource objects.

15. The apparatus of claim 14, comprising a resource security component operative to manage retrieval of access controls for the requested resource object and set of interrelated resource objects.

16. The apparatus of claim 14, the resource origin component operative to retrieve an access control for the requested resource object, and determine the access control for the requested resource object is the authorization origin.

17. The apparatus of claim 14, the resource origin component operative to identify one or more resource objects related to the resource object from the set of interrelated resource objects, retrieve an access control for one of the related resource objects, and determine that an access control for a related resource object is the authorization origin.

18. The apparatus of claim 14, the resource origin component operative to determine that a default access control is the authorization origin.

* * * * *